United States Patent
Vural et al.

(10) Patent No.: US 10,652,096 B2
(45) Date of Patent: May 12, 2020

(54) METHODS AND SYSTEMS FOR INFERRING NETWORK STRUCTURE FROM CASCADES

(71) Applicant: University of Notre Dame du Lac, South Bend, IN (US)

(72) Inventors: Dervis Can Vural, South Bend, IN (US); Sushrut Ghonge, Notre Dame, IN (US)

(73) Assignee: University of Notre Dame du Lac, South Bend, IN (US)

( * ) Notice: Subject to any disclaimer, the term of this patent is extended or adjusted under 35 U.S.C. 154(b) by 38 days.

(21) Appl. No.: 15/902,582

(22) Filed: Feb. 22, 2018

(65) Prior Publication Data

US 2018/0241634 A1 Aug. 23, 2018

Related U.S. Application Data

(60) Provisional application No. 62/461,912, filed on Feb. 22, 2017.

(51) Int. Cl.
*H04L 12/24* (2006.01)

(52) U.S. Cl.
CPC .......... *H04L 41/12* (2013.01); *H04L 41/0823* (2013.01); *H04L 41/0893* (2013.01); *H04L 41/145* (2013.01)

(58) Field of Classification Search
CPC . H04L 41/0823; H04L 41/0893; H04L 41/12; H04L 41/145; H04L 41/5009;
(Continued)

(56) References Cited

U.S. PATENT DOCUMENTS

| | | | |
|---|---|---|---|
| 2008/0106424 A1* | 5/2008 | Bouse | G05B 19/4065 340/635 |
| 2009/0248376 A1* | 10/2009 | Silva | H04L 41/5009 703/2 |

(Continued)

FOREIGN PATENT DOCUMENTS

| | | |
|---|---|---|
| CN | 106022937 A | 10/2016 |
| CN | 106570082 A | 4/2017 |

(Continued)

OTHER PUBLICATIONS

Rodriguez et al, "Inferring Networks of Diffusion and Influence," ACM Transactions on Knowledge Discovery from Data 5(4):1-37 (2012).

(Continued)

*Primary Examiner* — Le H Luu
(74) *Attorney, Agent, or Firm* — Greenberg Traurig, LLP

(57) ABSTRACT

Disclosed herein are systems, methods, and software for providing a network structure for a network. In one example, a method includes identifying an occurrence of a cascade amongst a plurality of nodes of the network. The method also includes determining respective activation times for each node of a plurality of activated nodes activated during the cascade. The method further includes, for each pairwise combination of activated nodes from the plurality of activated nodes, computing, based on the respective activation times, a connection probability that a pair of nodes from the plurality of activated nodes is connected by an edge. The method further includes mapping a true edge between two activated nodes of the plurality of activated nodes in the network based on computed connection probabilities for the each pairwise combination.

23 Claims, 18 Drawing Sheets

(58) Field of Classification Search
CPC .............. H04L 45/745; H04L 63/1425; G05B 19/0423; G05B 19/4065; G06Q 30/0631; H04W 40/24
See application file for complete search history.

(56) References Cited

U.S. PATENT DOCUMENTS

| | | | | |
|---|---|---|---|---|
| 2011/0133900 | A1* | 6/2011 | Kydles | G05B 19/0423 340/10.1 |
| 2014/0195303 | A1 | 7/2014 | Jarrett et al. | |
| 2016/0234236 | A1* | 8/2016 | Silva | H04L 63/1425 |
| 2016/0350834 | A1* | 12/2016 | Wilson | G06Q 30/0631 |
| 2016/0371792 | A1 | 12/2016 | Luo et al. | |
| 2017/0134259 | A1* | 5/2017 | Baron | H04L 45/745 |
| 2017/0222877 | A1* | 8/2017 | Sagot | H04W 40/24 |
| 2017/0286975 | A1 | 10/2017 | Pal et al. | |

FOREIGN PATENT DOCUMENTS

| | | |
|---|---|---|
| CN | 106570188 A | 4/2017 |
| CN | 106780058 A | 5/2017 |
| EP | 1754350 B1 | 11/2012 |

OTHER PUBLICATIONS

Snowsill et al., "Refining Causality: Who Copied from Whom?," Proceedings of the 17th ACM SIGKDD International Conference on Knowledge Discovery and Data Mining (ACM, 2011), 466-474.
V. Ntziachristos, "Going deeper than microscopy: the optical imaging frontier in biology," Nature Methods 7(8):603-614 (2010).
Berry et al., "Deciphering microbial interactions and detecting keystone species with co-occurrence networks," Frontiers in Microbiology 5, Article 219 (2014).
Rodriguez et al., "Structure and Dynamics of Information Pathways in Online Media," Proceedings of the Sixth ACM International Conference on Web Search and Data Mining (ACM, 2013) pp. 23-32.
Rodriguez et al., "Influence Maximization in Continuous Time Diffusion Networks," 29th International Conference on Machine Learning (ICML 2012) (International Machine Learning Society, 2012), pp. 1-8.
Rodriguez et al., "Uncovering the structure and temporal dynamics of information propagation," Network Science 2 (1):26-65 (2014).
Watts et al., "Influentials, Networks, and Public Opinion Formation," Journal of Consumer Research 34:441- 458 (2007).
Desmarais et al., "Persistent Policy Pathways: Inferring Diffusion Networks in the American States," American Political Science Review 109(2):392-406 (2015).
Hempel et al. "Inner Composition Alignment for Inferring Directed Networks from Short Time Series," Physical Review Letters 107, 054101 (2011).
Myers et al., "On the Convexity of Latent Social Network Inference," Advances in Neural Information Processing Systems (Neural Information Processing Systems Foundation, Inc., 2010) pp. 1741-1749.
Komorowski et al., "Bayesian inference of biochemical kinetic parameters using the linear noise approximation," BMC Bioinformatics 10:343 (2009).
Wilkinson, "Bayesian methods in bioinformatics and computation systems biology," Briefings in Bioinformatics 8 (2):109-116 (2007).
Golightly et al., "Bayesian Inference for Stochastic Kinetic Models Using a Diffusion Approximation," Biometrics 61: 781-788 (2005).
Boys et al., "Bayesian inference for discretely observed stochastic kinetic model," Statistics and Computing 18:125-135 (2008).
Faust et al., "Microbial interactions: from networks to models," Nature Reviews Microbiology 10:538-550 (2012).
Adar et al., "Tracking Information Epidemics in Blogspace," Proceedings of the 2005 IEEE/WIC/ACM International Conference on Web Intelligence (IEEE Computer Society, 2005) pp. 207-214.
Gruhl et al., "Information Diffusion Through Blogspace," Proceedings of the 13th International Conference on World Wide Web (ACM, 2004) pp. 491-501.
Vural et al., "Aging in complex interdependency networks," Physical Review E 89, 022811 (2014).
Gleeson, "Cascades on correlated and modular random networks," Physical Review E 77, 046117 (2008).
Friedman et al., "Being Bayesian About Network Structure, a Bayesian Approach to Structure Discovery in Bayesian Networks," Machine Learning 50:95-125 (2003).
MacRae, "Direct Factor Analysis of Sociometric Data," Sociometry 23(4):360-371 (1960).
Zachary, "An Information Flow Model for Conflict and Fission in Small Groups," Journal of Anthropological Research 33(4):452-473 (1977).
Burt, "Social Contagion and Innovation: Cohesion versus Structural Equivalence," American Journal of Sociology 92 (6):1287-1335 (1987).
Coleman et al., "The Diffusion of an Innovation among Physicians," Sociometry 20:253-270 (1957).
Valente, Network Models of the Diffusion of Innovations (Hampton Press, New York, 1995).
Van den Bulte et al., "Medical Innovation Revisited: Social Contagion versus Marketing Effort," American Journal of Sociology 106(5):1409-1435 (2001).

* cited by examiner

DATA STRUCTURE
802

| ACTIVATED NODE IDENTIFIERS | ACTIVATION TIME DATA | COMPUTED CONNECTION PROBABILITY VALUES |
|---|---|---|
| NODE A | DATA | VALUE(S) |
| NODE B | DATA | VALUE(S) |
| NODE C | DATA | VALUE(S) |
| ⋮ | ⋮ | ⋮ |
| NODE ($n-1$) | DATA | VALUE(S) |
| NODE $n$ | DATA | VALUE(S) |

FIG. 8

METHODS AND SYSTEMS FOR INFERRING NETWORK STRUCTURE FROM CASCADES

CROSS-REFERENCE TO RELATED APPLICATIONS

This application is related to and claims priority to U.S. Provisional Patent Application No. 62/461,912, entitled "INFERRING NETWORK STRUCTURES FROM CASCADES," filed Jan. 22, 2017, and which is incorporated by reference herein in its entirety.

FIELD

The present disclosure relates generally to network analysis systems, and more particularly to a method and system for establishing network structure.

BACKGROUND

A variety of physical, biological, and social phenomena in a wide array of systems may be analyzed, modeled and/or described by cascades taking place on a network. While network activity can be empirically observed, establishing network structure empirically is tedious. Thus, there is a need for more efficient and generally-applicable methods and systems for quickly and accurately determining structures of networks of interest.

REFERENCES CITED

[1] M. G. Rodriguez, J. Leskovec, and A. Krause, in *Proceedings of the 16th ACM SIGKDD International Conference on Knowledge Discovery and Data Mining* (ACM, 2010), pp. 1019-1028.
[2] T. M. Snowsill, N. Fyson, T. D. Bie, and N. Cristianini, in *Proceedings of the 17th ACM SIGKDD International Conference on Knowledge Discovery and Data Mining* (ACM, 2011), pp. 466-474.
[3] V. Ntziachristos, Nature Methods 7, 603 (2010).
[4] D. Berry and S. Widder, Frontier in Microbiology 5, 219 (2014).
[5] M. G. Rodriguez, J. Leskovec, and B. Schlkopf, in *Proceedings of the Sixth ACM International Conference on Web Search and Data Mining* (ACM, 2013) pp. 23-32.
[6] M. Gomez Rodriguez, B. Schlkopf, L. J. Pineua et al., in 29th International Conference on Machine Learning (ICML 2012) (International Machine Learning Society, 2012), pp. 1-8.
[7] M. G. Rodriguez, J. Leskovec, D. Balduzzi, and B. Schlkopf, Network Science 2, 26 (2014).
[8] D. J. Watts and P. S. Dodds, Journal of Consumer Research 34, 441 (2007).
[9] B. A. Desmarais, J. J. Harden, and F. J. Boehmke, American Political Science Review 109, 392 (2015).
[10] S. Hempel, A. Koseska, J. Kurths, and Z. Nikoloski, Physical Review Letters 107, 054101 (2011).
[11] S. Myers and J. Leskovec, in *Advances in Neural Information Processing Systems* (Neural Information Processing Systems Foundation, Inc., 2010) pp. 1741-1749.
[12] M. Komorowski, B. Finkenstdt, C. V. Harper, and D. A. Rand, BMC Bioinformatics 10, 343 (2009).
[13] D. J. Wilkinson, Briefings Bioinformatics 8, 109 (2007).
[14] A. Golightly and D. J. Wilkinson, Biometrics 61, 781 (2005).
[15] R. J. Boys, D. J. Wilkinson, and T. B. Kirkwood, Statistics and Computing 18, 125 (2008).
[16] K. Faust and J. Raes, Nature Reviews Microbiology 10, 538 (2012).
[17] E. Adar and L. A. Adamic, in *Proceedings of the 2005 IEEE/WIC/ACM International Conference on Web Intelligence* (IEEE Computer Society, 2005) pp. 207-214.
[18] D. Gruhl, R. Guha, D. Liben-Nowell, and A. Tomkins, in *Proceedings of the 13th International Conference on World Wide Web* (ACM, 2004) pp. 491-501.
[19] D. C. Vural, G. Morrison, and L. Mahadevan, Physical Review E 89, 022811 (2014).
[20] J. P. Gleeson, Physical Review E 77, 046117 (2008).
[21] N. Friedman and D. Koller, Machine Learning 50, 95 (2003).
[22] D. MacRae, Sociometry 23, 360 (1960).
[23] W. W. Zachary, Journal of Anthropological Research 33, 452 (1977).
[24] R. S. Burt, American Journal of Sociology 92, 1287 (1987).
[25] J. Coleman, E. Katz, and H. Menzel, Sociometry 20, 253 (1957).
[26] T. W. Valente, *Network Models of the Diffusion of Innovations* (Hampton Press, New York, 1995).
[27] C. Van den Bulte and G. L. Lilien, American Journal of Sociology 106, 1409 (2001).

In this disclosure, references to the above sources, which are numbered in single bracket "[ ]", are made using the corresponding number in the single brackets, in the same manner as those sources are listed above.

SUMMARY

Examples disclosed herein provide systems, methods, and software for providing a network structure for a network. In one aspect, a method executed on a computing device to provide a network structure for a network is disclosed. The method includes identifying an occurrence of a cascade amongst a plurality of nodes of the network. The method also includes determining respective activation times for each node of a plurality of activated nodes activated during the cascade. The method further includes, for each pairwise combination of activated nodes from the plurality of activated nodes, computing, based on the respective activation times, a connection probability that a pair of nodes from the plurality of activated nodes is connected by an edge. The method further includes mapping a true edge between two activated nodes of the plurality of activated nodes in the network based on computed connection probabilities for the each pairwise combination.

In another aspect, a computer apparatus to provide a network structure for a network includes processing instructions that direct a computing system to identify an occurrence of a cascade amongst a plurality of nodes of the network is disclosed. The processing instructions further direct the computing system to determine respective activation times for each node of a plurality of activated nodes activated during the cascade. The processing instructions further direct the computing system to, for each pairwise combination of activated nodes from the plurality of activated nodes, compute, based on the respective activation times, a connection probability that a pair of nodes from the plurality of activated nodes is connected by an edge. The processing instructions further direct the computing system to map a true edge between two activated nodes of the plurality of activated nodes in the network based on computed connection probabilities for the each pairwise combination.

In yet another aspect, a non-transitory computer-readable storage medium is disclosed. The non-transitory computed-readable storage medium includes processor-executable instructions stored therein to provide a network structure for a network. When executed by one or more processors, the processor-executable instructions cause the one or more processors to identify an occurrence of a cascade amongst a plurality of nodes of the network. When executed by one or more processors, the processor-executable instructions further cause the one or more processors to determine respective activation times for each node of a plurality of activated nodes activated during the cascade. When executed by one or more processors, the processor-executable instructions further cause the one or more processors to, for each pairwise combination of activated nodes from the plurality of activated nodes, compute, based on the respective activation times, a connection probability that a pair of nodes from the plurality of activated nodes is connected by an edge. When executed by one or more processors, the processor-executable instructions further cause the one or more processors to map a true edge between two activated nodes of the plurality of activated nodes in the network based on computed connection probabilities for the each pairwise combination.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given in connection with the various embodiments of the disclosure is intended to be illustrative, and not restrictive.

Throughout the disclosure, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the disclosure may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references, unless the context clearly dictates otherwise. The meaning of "in" includes "in" and "on".

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 8 illustrates a data structure that may be used with the method of FIG. 5 and the computing system of FIG. 6 in accordance with one embodiment of the disclosure.

DETAILED DESCRIPTION

Neural networks, ecosystems, epidemics, range expansions, gene-protein interactions, diffusion in evolutionary landscapes and many other interesting biological and social phenomena are naturally encoded by cascades on complex networks. Often we can observe when people adopt certain ideas, but we cannot see what social exchanges lead to it. We can observe when species go extinct, but do not know why [1]. We see when the same content appears in several websites and blogs over time, but since we do not know who copied from whom, we cannot tell who follows who [2]. A sequence of neural firings can be observed by fluorescent imaging, but it is not trivial to infer neural connectivity [3].

Establishing network structure empirically is tedious. Ideally, to determine the presence of an edge between a node pair, one must perturb one while measuring the response of the other, making sure the rest is unchanged. Proxies such as correlation coefficients can be used, but these yield unreliable results (e.g., [4]). Furthermore, proxies depend on specific models, e.g. the presence of an edge could just as well imply a lack of correlation.

The problem of topological inference has been previously addressed as a convex optimization problem, and only specific cases have been solved [1, 5, 6]. Others have considered inferring topology when each cascade affects only few nodes, and only when few several such cascades take place simultaneously [7].

This disclosure provides methods and systems for determining network structures that are applicable to a wide range of networks, including the general class of cascade models where the probability that a node activates depends on the degree of the node and the states of the neighboring nodes. In this class of models the activation of every node is permanent until the cascade ends.

While complex networks may includes millions, or even much greater, numbers of nodes and edges, their structures are, of course, composed of individual nodes. In the present disclosure, determining network structures (i.e., the specific connections amongst the nodes by edges) may proceed systematically using smaller sets of nodes with fewer numbers of edges, as compared to the entire network. Using computing systems and methods including, without limitation, "massively parallel processing," network cascades may be analyzed on different parts of complex networks in a substantially simultaneous fashion. This disclosure proceeds from the vantage point of a network having comparatively few nodes relative to the many and various networks known from nature, industry, and business and social interactions. However, one skilled in the art will appreciate that the systems and methods disclosed herein are applicable to providing a network structure for entire networks, or parts thereof, having a plurality of nodes, regardless of the number of nodes and the number of edges.

Figure 1:
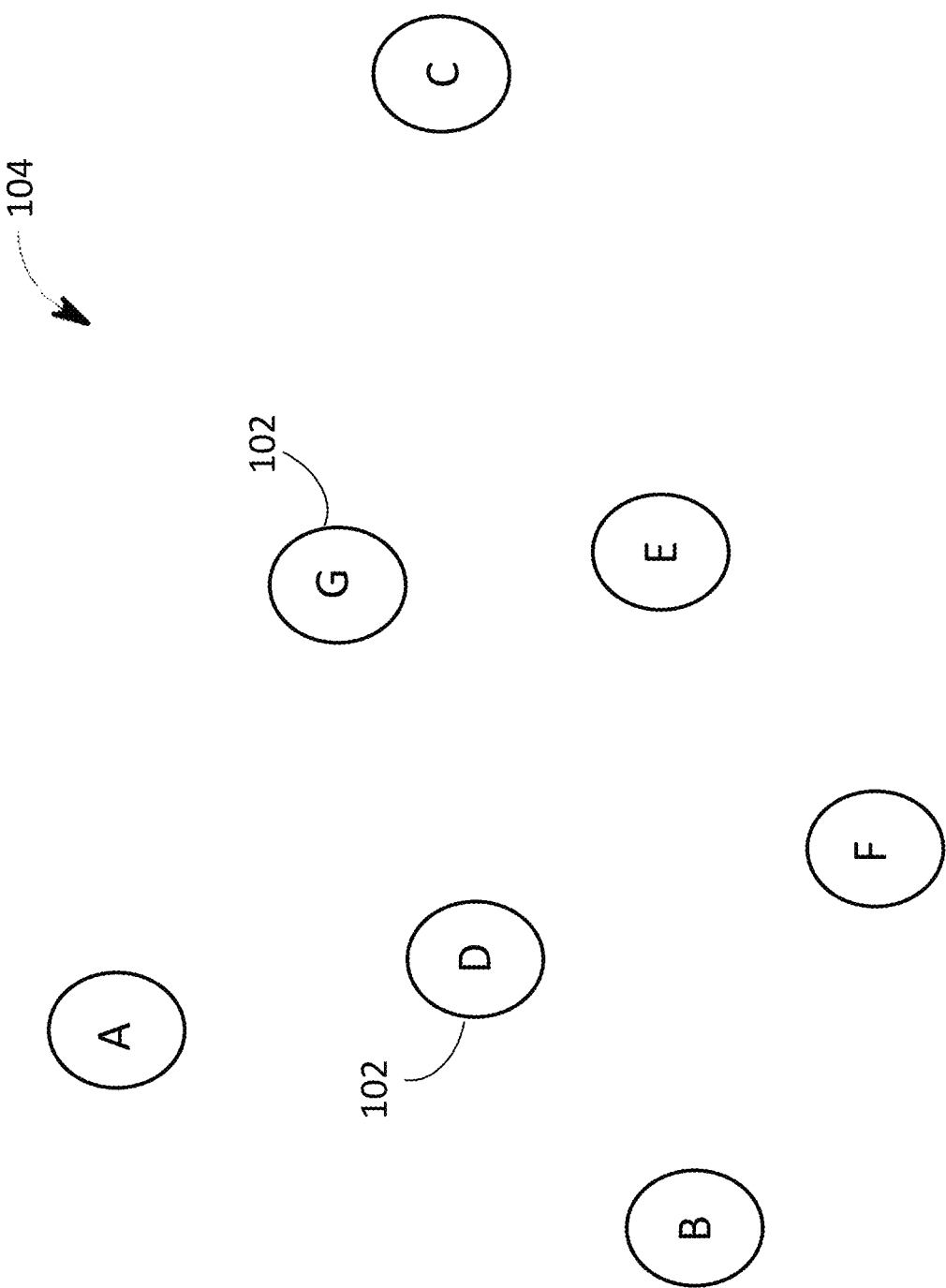
FIG. 1 illustrates a plurality of nodes of a network.

FIG. 1 illustrates seven nodes 102 (nodes A, B, C, D, E, F, and G) of a network 104. Network 104 may be a network in which no information is available as to whether or not some or all of the nodes are connected by edges. Alternatively, network 104 may be known to be a network where at least some of the nodes are connected by edges. As such, network 104 may have an at least partially uncharacterized and/or unknown network structure.

As used herein, the meaning of "structure" and "network structure" includes a topology of node-to-node connections by edges amongst the nodes of the network. As will be appreciated by those skilled in the art, although nodes 102 are illustrated in FIG. 1 as being close to each other, such network illustrations need not be drawn to scale as to spatial, relational, or other quantitative measure or qualitative attributes of respective nodes. For example, nodes that are drawn closet to a particular node than to some other node(s) may, in the case of networks where nodes represent people, objects, and other physical entities, the nodes may reside in space at large and widely varying distances from one another despite their being drawn in such illustrations as being closer or further apart. Further, as will be clear to persons skilled in the art, the disclosed systems and methods are equally applicable for networks where nodes represent physical objects, points, places or regions, events, relationships, and many other observable phenomena that lend themselves to network representations, as are used and discussed herein.

Figure 2:
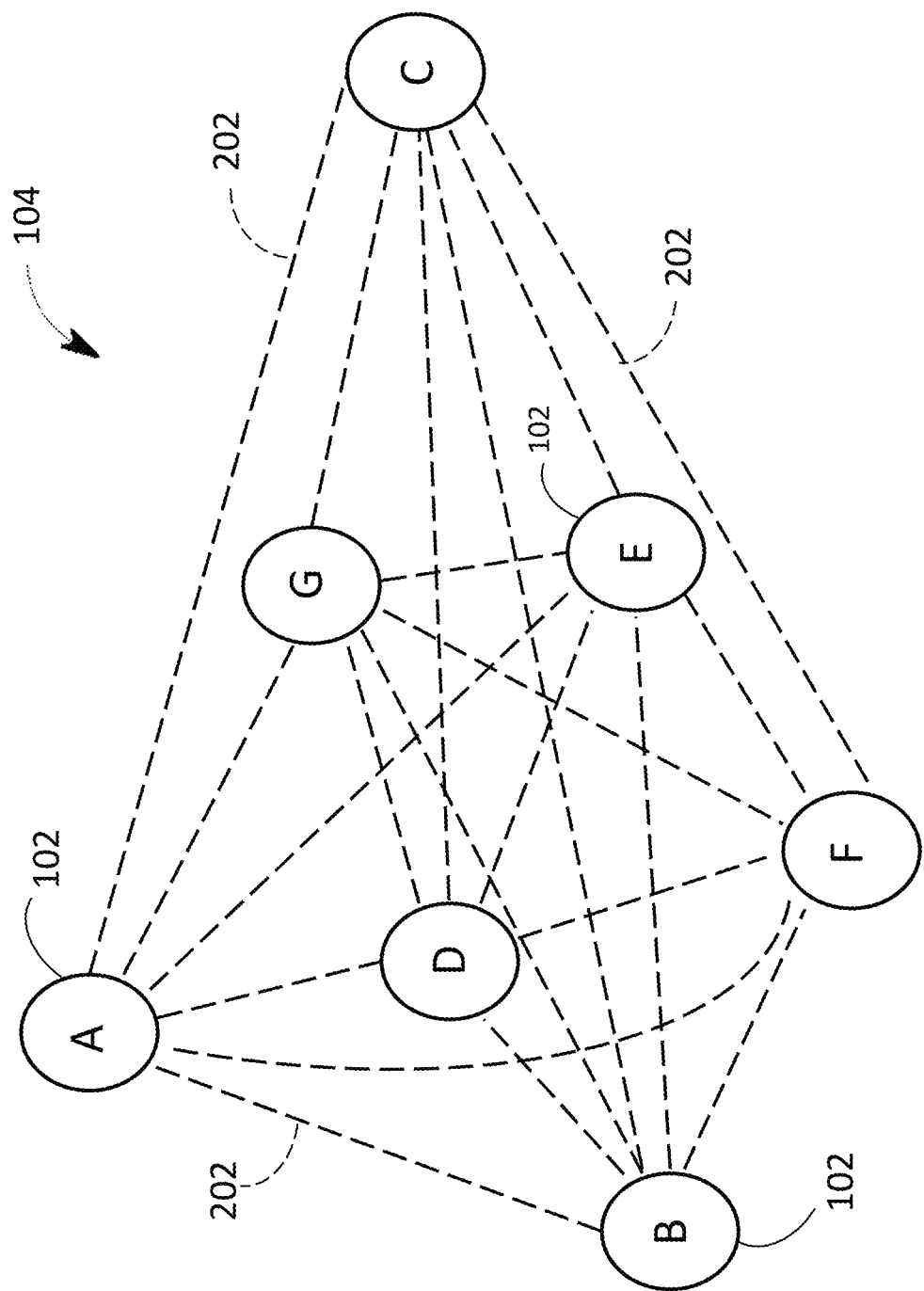
FIG. 2 illustrates the network of FIG. 1 including all possible edges between each of the nodes.

FIG. 2 illustrates the network 104 of FIG. 1 where all possible edges 202 between each of the nodes 102 are drawn as dashed lines between each node 102. In the case where, as illustrated in FIG. 2, network 104 represents a part of a wider network, and the part shown in FIG. 2 has a fully unknown structure, the edges 202 connect every pairwise combination of nodes 102 of network 104. As the dashed-line edges 202 in FIG. 2 are drawn for the network 104 whose structure is, in this example, fully uncharacterized as to its structure, these edges 202 are putative, rather than true edges.

Figure 3:
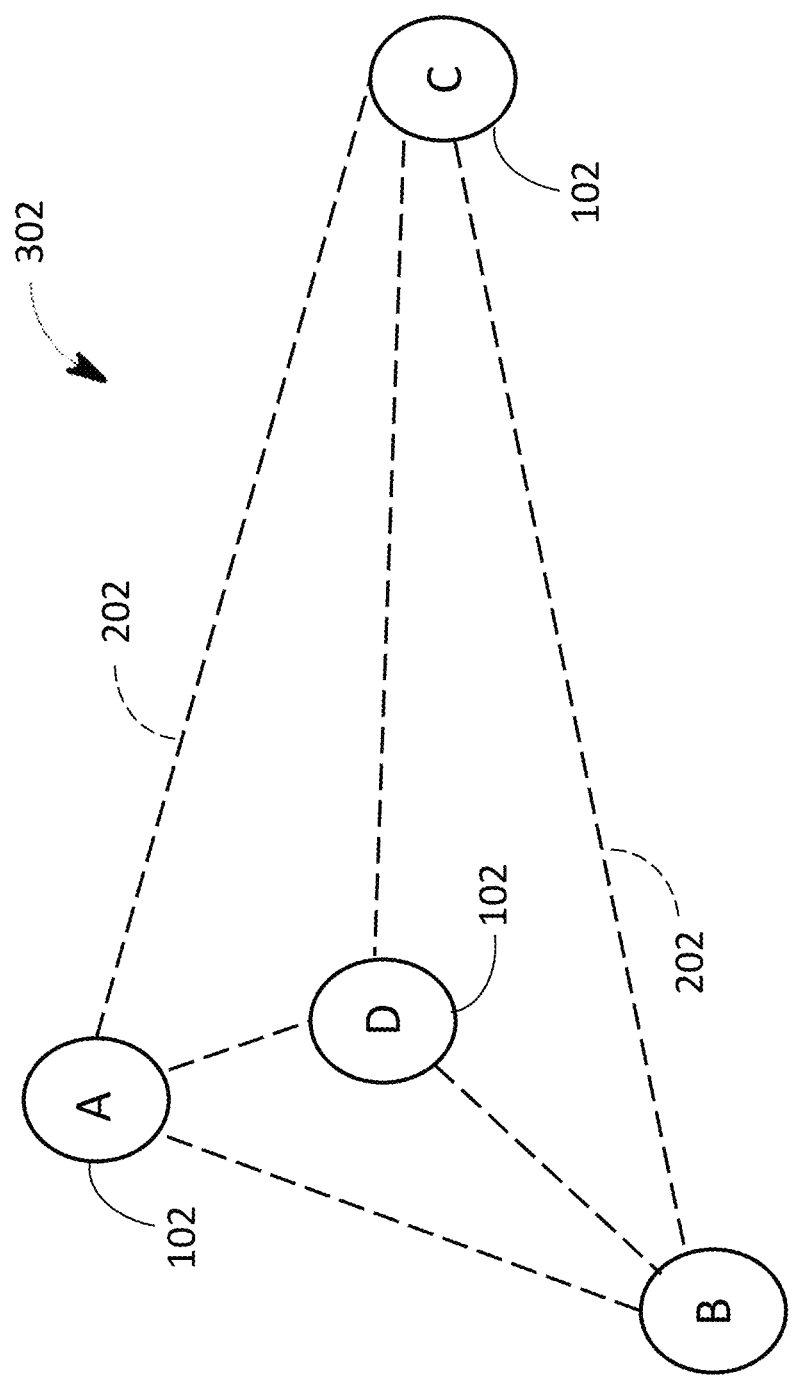
FIG. 3 illustrates a network composed of a narrower subset of the nodes shown in FIGS. 1 and 2.

FIG. 3 illustrates a network 302 composed of a narrower subset of nodes 102 (nodes A, B, C, and D) of network 104. As in FIG. 2, the dashed-line edges 202 in FIG. 3 connect every pairwise combination of nodes 102 of network 104 having an as yet undetermined structure.

Figure 4A:
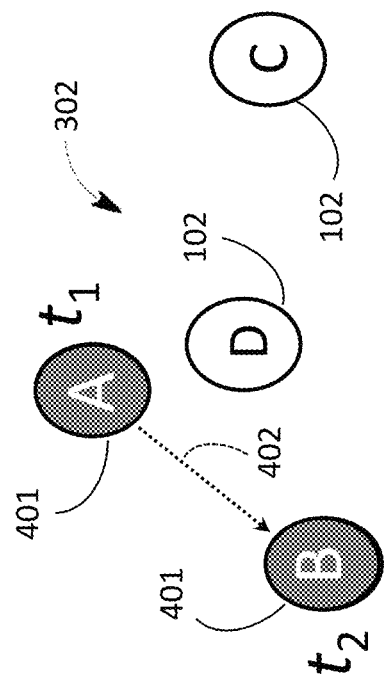
FIG. 4A illustrates the network shown in FIG. 3 at a first time after an occurrence of a cascade amongst the plurality of nodes of the network.

FIGS. 4A-4D illustrate the network 302 of FIG. 3 following an occurrence of a cascade amongst the plurality of nodes 102. In FIG. 4A, the cascade of node activation begins at a first time ($t_1$) with node A activating (as shown as a shaded node A, in contrast to a non-shaded node A in FIGS. 1-3). An activation time of a first activated node 401 (e.g., node A) of network 302 is thus labeled as $t_1$ in FIG. 4A.

As used herein, the terms "activation," "activating," "activated," and "active" mean that a node changes state from a first state to a second state that is different from the first state, where this node state change is observable or measurable, and where, for a given cascade, the nodes that activate during the cascade change (i.e., "activate") from the same first state to the same second state. For example, and without limitation, in one embodiment of network 302, the nodes 102 represent persons in a social network, the first state of each of the nodes 102 is a "like" indication of a new music album not present on their website, and the second state is a "like" indication being posted to their website. In another embodiment of network 302, the nodes 102 represent distribution transformers of an electric grid in different locations, the first state of each of the nodes 102 is a fully functional state of operation, and the second state is a fully non-functional state of operation. In yet another embodiment of network 302, the nodes 102 represent neurons or clusters of neurons separated by some distance in the human brain, the first state of each of the nodes 102 is a non-firing (e.g., non-excited) state, and the second state is a firing (e.g., excited) state. In still another embodiment of network 302, the first state may be denoted or encoded as a 0 (zero) to indicate the not activated state, and the second state may be denoted or encoded as a 1 to indication the activated state.

Figure 4B:
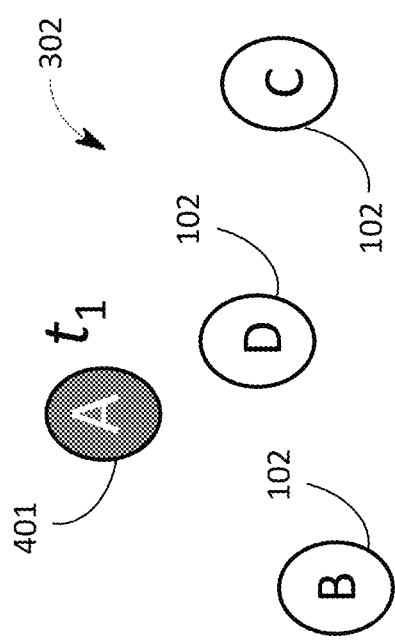
FIG. 4B illustrates the network shown in FIG. 4A at a second time after the occurrence of the cascade.

In FIG. 4B, the cascade of node activation continues from node A having activated at $t_1$ to node B activating at a second time ($t_2$), where $t_2$ occurs after $t_1$. The activation time of a second activated node 401 (e.g., node B) of network 302 is thus labeled as $t_2$ in FIG. 4B. With no additional nodes 102 activating during the cascade at any intervening times between the activations of nodes A and B, a dotted-line edge 402 may be at least inferred to connect nodes A and B in network 302.

Figure 4C:
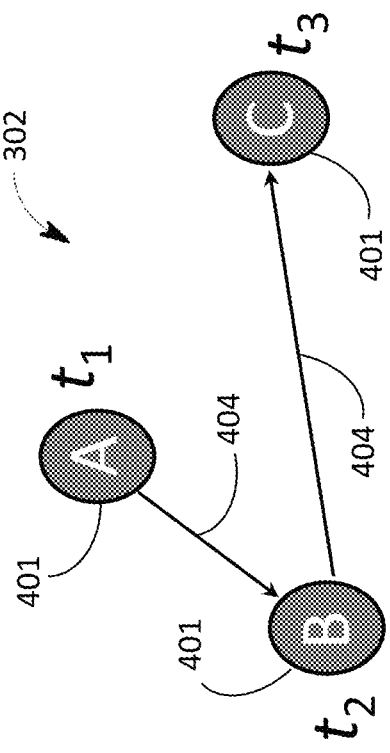
FIG. 4C illustrates the network shown in FIGS. 4A and 4B at a third time after the occurrence of the cascade.

In FIG. 4C, the cascade of node activation continues from node B having activated at $t_2$ to node C activating at a third time ($t_3$), where $t_3$ occurs after $t_2$. The activation time of a third activated node 401 (e.g., node C) of network 302 is thus labeled as $t_3$ in FIG. 4C. With no additional nodes 102 activating during the cascade at any intervening times between the activations of nodes B and C, dotted-line edges 402 may be at least inferred to connect nodes B and C and nodes A and C in network 302.

FIG. 4C also depicts the conclusion of the cascade in network 302, where a fourth node 102 (e.g., node D) was not activated during the cascade, and thus is not shaded in FIG. 4C. Thus, the network structure depicted by the shaded nodes 102 and dotted-line edges 402 in FIG. 4C does not provide an actual network structure for network 302. Following the conclusion of the cascade, the respectively determined activation times for nodes A, B, and C, and the absence thereof for node D, provides an incomplete picture of the network structure, and answering, with a high degree of confidence, the question of whether node A is connected to node B, to node C, or to both nodes B and C, and likewise whether or not nodes B and C are connected, is addressed by the disclosed methods and systems. Given determined respective activation times for each of the activated nodes 401 (e.g., A, B, and C), the dotted-line edges 402 shown in FIG. 4C represent each pairwise combination (e.g., A-B, A-C, B-A, B-C, C-A, and C-B) of activated nodes 401 from the four activated nodes 401 (e.g., nodes A, B, and C).

Figure 4D:
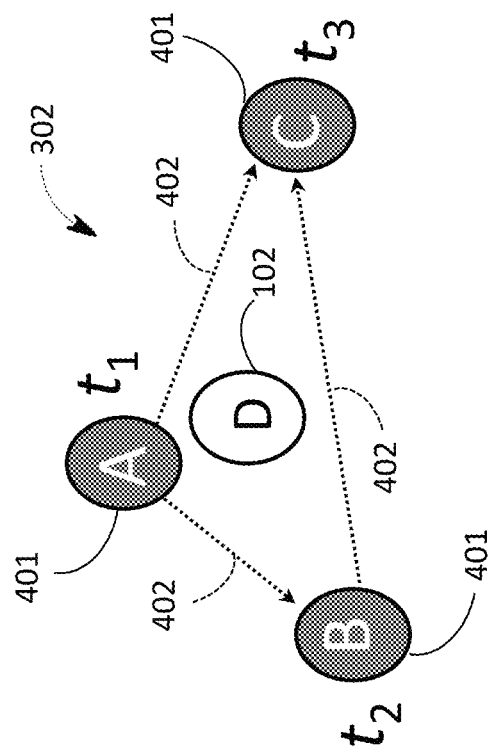
FIG. 4D illustrates the network shown in FIG. 4C including true edges mapped between activated nodes in accordance with one embodiment of the disclosure.

FIG. 4D illustrates network 302 for which an actual network structure is provided using the disclosed methods and system. In FIG. 4D, the actual structure of network 302 is depicted by true edges 404 connecting node A to node B and node B to node C. As further shown and described below, the application of the disclosed systems and methods to provide the network structure of, for purposes of example only, network 302 includes a mapping of true edges between nodes A and B, and between nodes B and C.

Figure 5:
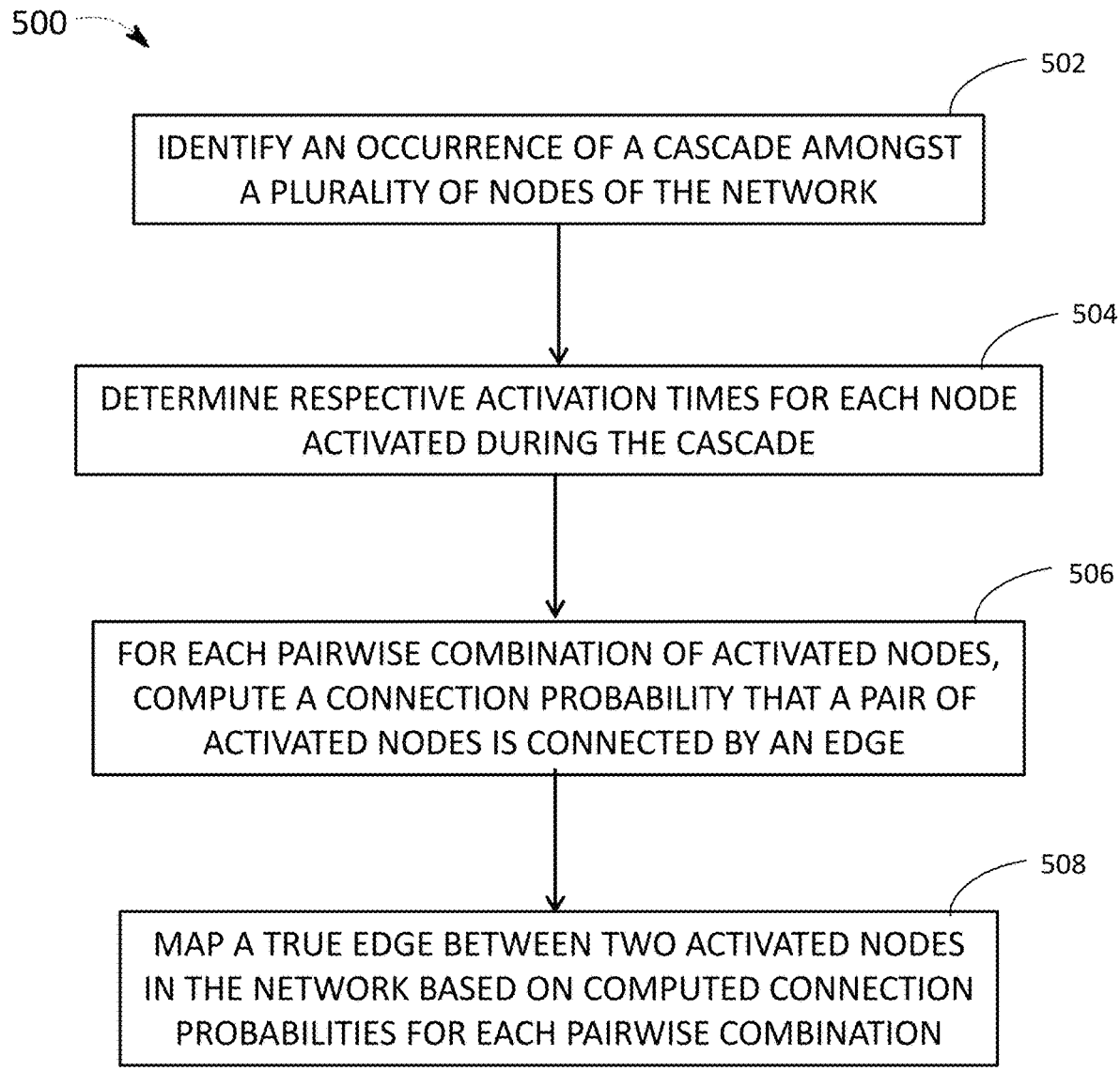
FIG. 5 illustrates a flowchart of one embodiment of the disclosed method.
Figure 6:
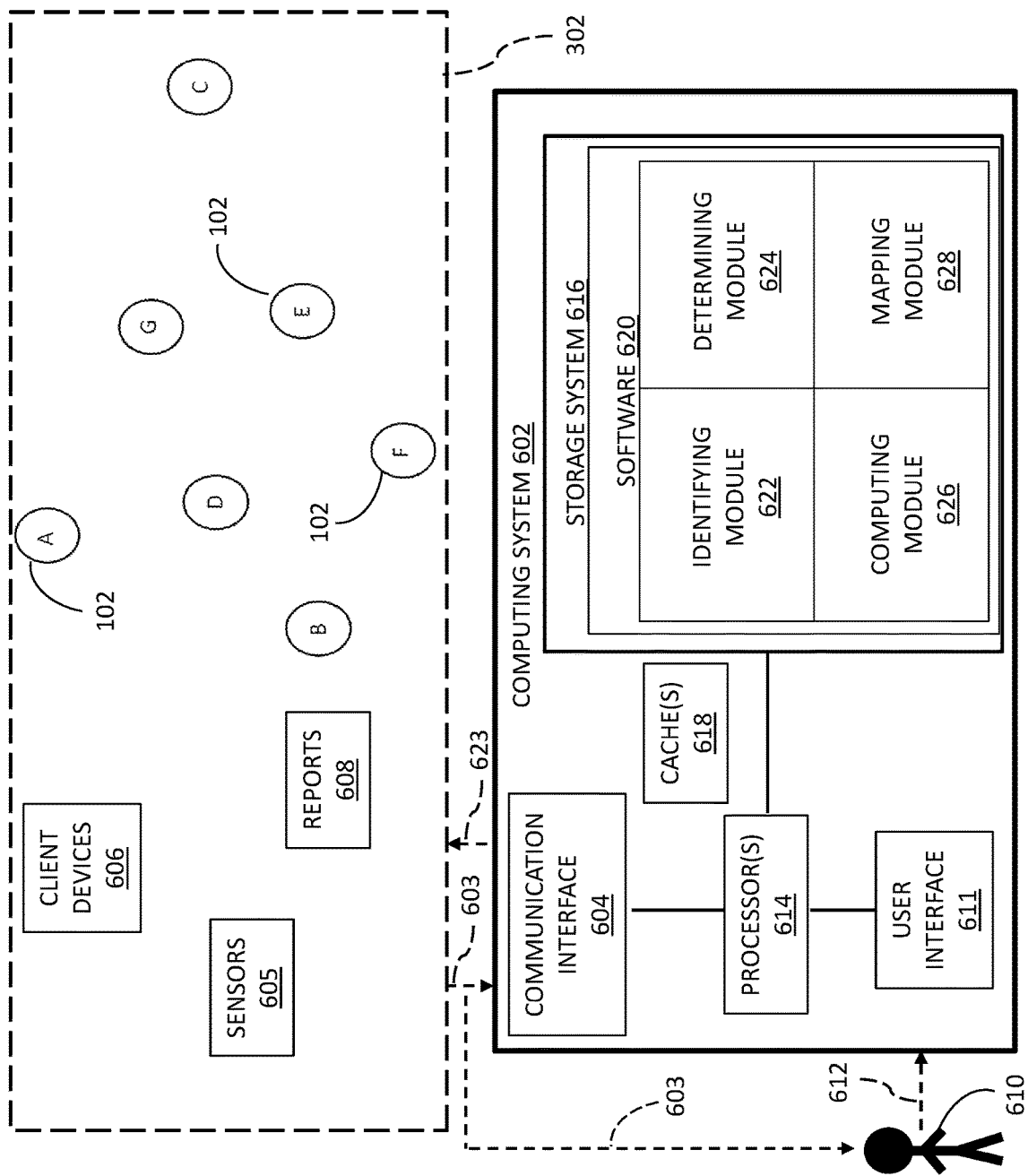
FIG. 6 illustrates a computing system configured for performing the method shown in FIG. 5 in accordance with one embodiment of the disclosure.

Referring now to FIGS. 5-11, one embodiment of the disclosed method includes steps executed on a computing device or a computing system 602 to provide a network structure for a network (e.g., network 302). FIG. 5 is a flowchart of one embodiment of the disclosed method. Method 500 includes the step of identifying 502 an occurrence of a cascade amongst a plurality of nodes of the network. Method 500 includes the step of determining 504 respective activation times for each activated node of a plurality of activated nodes 401 activated during the cascade. Method 500 includes the step of computing 506, for each pairwise combination of activated nodes 401 from the plurality of activated nodes 401 and based on the respective activation times, a connection probability that a pair of nodes 401 from the plurality of activated nodes 401 is connected by an edge (e.g., edge 402). Method 500 includes mapping 508 a true edge (e.g., true edge 404) between two activated nodes 401 of the plurality of activated nodes 401 in the network (e.g., network 302) based on computed connection probabilities for the each pairwise combination.

In one embodiment, the disclosed method includes an assigning step. The assigning step includes assigning to the network (e.g., network 302) a forward dynamics rule by which the cascade propagates amongst the plurality of nodes (e.g., activated nodes 401) of the network. In the embodiment, the computing 506 step includes computing 506 the connection probability based on the assigned forward dynamics rule.

Forward Dynamics.

Considering the general model where the probability that a node activates is an arbitrary function $f(m/k)$ of the ratio of the number of active providers m and its indegree k, the fraction of nodes that activate at time t may be denoted by D(t) and the fraction of nodes active at t by Q(t), so that $Q(t)=\Sigma_{\tau=1}^{t} D(\tau)$.

For both the forward solution and the topological inversion, the probability that m out of k providers of a node have activated after a time t may be approximated as:

$$B(m, k, Q(t)) = \binom{k}{m}(Q(t))^m (1 - Q(t))^{k-m},$$

where Q(t) is the fraction of nodes active at t. In one embodiment, Q(t) is determined recursively.

For a node with k providers, the probability D(t) of activating is the sum over all possible number of activated providers of the product of the probability of that number of providers being active and the value of $f$ at that number. Since the degree distribution ($\Gamma(k)$) is the fraction of nodes with indegree k, for a random node with unknown indegree, D(t) may be defined as:

$$D(t) = \sum_{k} \Gamma(k) \sum_{m=0}^{k} B(m, k, Q(t-1)) f(m/k) \qquad (1)$$

This is a recursive equation, and solving it commences at t=1, since all nodes are inactive at t=0, $D(1)=f(0)$. For t≥2, D(t) is obtained in terms of $Q(t-1)=\Sigma_{\tau=1}^{t-1} D(i)$ from Eqn. (1) which is easily iterated. This recursive equation was studied in detail in Ref. [20].

Figure 7:
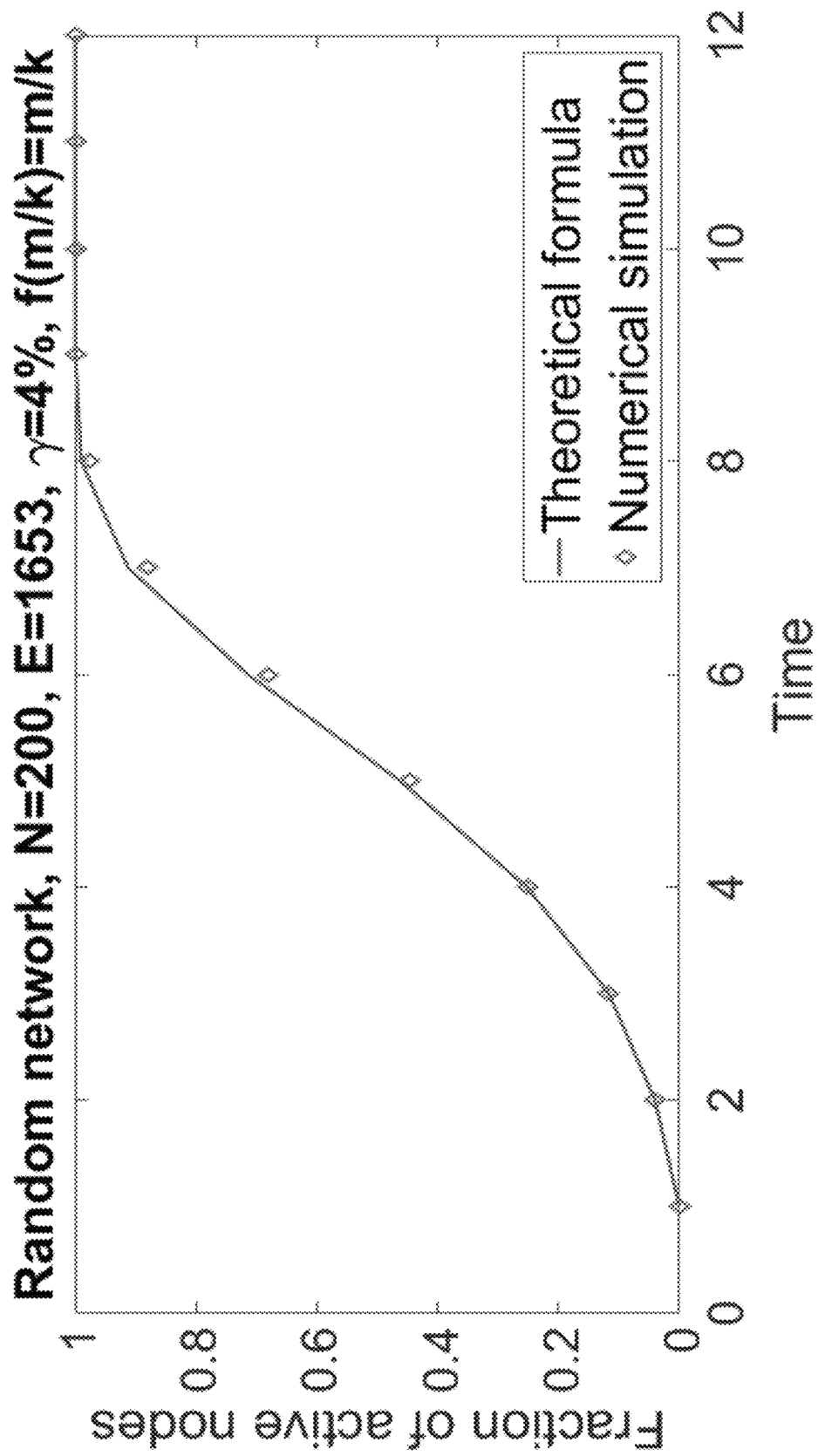
FIG. 7 illustrates forward dynamics for a random network as a plot of the fraction of active nodes versus activation times using numerical simulations and using a theoretical formula in accordance with one embodiment of the disclosure.

FIG. 7 illustrates forward dynamics for a random network as a plot of the fraction of active nodes versus activation times using numerical simulations and using a theoretical formula (based on Eqn. (1)) in accordance with one embodiment of the disclosure. As shown in FIG. 7, obtaining D(t) for t≥2 in terms of $Q(t-1)=\Sigma_{\tau=1}^{t-1} D(i)$ from Eqn. (1) agrees reasonably well with numerical simulations for the random network. Thus, for a network of interest (e.g., network 302), the step of assigning the forward dynamics rule may include first obtaining an approximate forward formula (e.g., the forward dynamics rule) for the number of affected nodes.

For the assigning step, in one embodiment of the disclosed method, the assigning step includes assigning the forward dynamics rule based on an activation dependence of each activated node 401 on at least one other activated node 401 of the plurality of activated nodes 401.

As noted above, a wide variety of network systems and models are amenable for application of the disclosed systems and methods [1, 2, 5-19]. In some of these network models, nodes activate when a critical fraction of their providers (in-neighbors) activate. In others, nodes do not deterministically activate when the number of active providers meets a threshold; instead their probability of activation jumps to a different value. In several other models, every active node linearly adds to the activation probability of their common neighbor. In general, a node can respond to its neighbors arbitrarily.

Thus, in operation of the disclosed systems and methods, in one embodiment, for the assigning step, the forward dynamics rule includes an activation probability of each activated node. In one embodiment, where the forward dynamics rule includes an activation probability of each activated node, each activated node has at least one provider node in the network. In this embodiment, the activation probability is a function (e.g., ƒ(m/k)) of a fraction of a number of activated provider nodes of the each node over a total number of provider nodes of each activated node. In one embodiment, the disclosed methods and systems include selecting the forward dynamics rule function prior to assigning the forward dynamics rule to the network of interest (e.g., network 302). In one embodiment, a network of interest may have a plurality of forward dynamics rule approximations in the form of a plurality of ƒ(m/k) functions, and the step of assigning the forward dynamics rule to the network of interest may include selecting one forward dynamics rule function from a plurality of different ones of the function.

In one embodiment, method 500 includes a selecting step. In the embodiment, the selecting step includes selecting the function for the activation probability prior to performing the assigning step. In one embodiment, the selecting step includes selecting, for the assigning step, one activation probability function from a plurality of different ones of the activation probability function. As further described below with reference to Table 1, the particular choose of the activation probability function from a plurality of different functions in which each function depends on m/k may influence the % accuracy of the network structure provided by the disclosed systems and methods for particular networks of interest. In another embodiment, method 500 may include a step of assigning the degree distribution (Γ(k)) to the network of interest (e.g., network 302).

In another embodiment, method 500 may be performed a first time for a first number of times using a first assigned forward dynamics rule function, and then method 500 may be performed for at least a second time for a second number of times using at least a second assigned forward dynamics rule function, where the first and the at least a second assigned forward dynamics rule functions are different from one another. In one embodiment, the first and the at least a second assigned forward dynamics rule functions are both functions of m/k. In one embodiment, the first number of times and the second number of times are equal in number. In this embodiment, method 500 may including selecting the forward dynamics rule function for use in the assigning step of the disclosed methods and systems based on a resultant accuracy (e.g., accuracy (%)) for the provided network structure. In one embodiment, the forward dynamics rule function selected for assigning to the network of interest from among the first and the at least a second assigned forward dynamics rule function is that assigned forward dynamics rule function resulting in the greatest resultant accuracy for the network of interest.

In yet another embodiment, a particular forward dynamics rule function may be known to be applicable to the network of interest, in which case that one particular forward dynamics rule function is assigned to the network of interest.

For the identifying 502 step of method 500, the occurrence of the cascade may include receiving one of more signals 603 from the network (e.g., network 302) at a communication interface 604 of computing system 602. In one embodiment, the signal(s) 603 may include data encoding an activation status of one or more nodes (e.g., nodes 102) of the network (e.g., network 302). For example, and without limitation, in the case of a network of distribution transformers in an electric grid, each node includes at least one distribution transformer, and the signal(s) 603 may provide encoded data indicating the operational status of each node. Such operational status-indicating signal(s) 603 for electrical, mechanical, and other machines and physical objects and systems may be directly or indirectly (e.g., after "measurements" are further processed locally to the respective node(s)) transmitted to computing system 602 by sensors 605 in the network. Similarly, where the nodes 102 of the network (e.g., network 302) represent neurons of the human brain, sensors 605 may provide signal 603 data indicative of respective excitation states of the neurons.

In another example, the nodes (e.g., nodes 102) of the network (e.g., network 302) may represent people having client devices 606 (e.g., smartphones) connected directly or indirectly (e.g., via intermediate servers, not shown in FIG. 6) to the computing system 602. In such cases, a person or group associated with respective nodes 102 may transmit signal(s) 603 via their respective client device(s) 606 to indicate their respective activation status. Alternatively, or in addition to, person(s) transmitting signal(s) 603 to computing system 602 using client device(s) 606, such persons represented by nodes 102 in network 302 (e.g., operators of transmission transformers and other machines) may, for example, transmit signal(s) 603 as reports 608 to a user 610 of computing system 602. Such reports 608 may be in the form of phone calls, text messages, SMS messages, and/or emails. In that case, user 610 may relay, via a user interface 611, information contained in the reports 608 to computing system 602 as input data 612. Likewise, the assigning step of method 500 may include the user 610 assigning the forward dynamics rule, discussed above, by providing it to computing system 602 as input data 612 via user interface 611. In one embodiment of the disclosed methods and systems, the forward dynamics rule may be stored in memory device(s) (e.g., non-transitory and/or transitory processor 614-readable data storage media) of a storage system 616 of computing system 602.

In the various embodiments, discussed above by way of example only, the identifying 502 step facilitates detecting (by way of signals 603), inputting (e.g., by way of input data 612), and/or otherwise providing an indication, as data, to computing system 602 to identify the occurrence of a cascade amongst the plurality of nodes 102 of network 302. In one embodiment, the occurrence of the cascade is deemed identified by computing system 602 and/or user 610 when one of the plurality of nodes 102 activates in network 302. In another embodiment, the occurrence of the cascade is deemed identified by computing system 602 and/or user 610 when at least two of the plurality of nodes 102 activates in network 302.

Thus, in one embodiment of method 500, the identifying 502 step facilitates accomplishing the determining 504 step. In one embodiment, the signal(s) 603 contain the respective activation time data for each node of the plurality of activated nodes activated during the cascade. In another embodiment, the signal(s) 603 contain data that, upon further processing by processor(s) 614 of computing system 602, provide the respective activation time data for each node of the plurality of activated nodes activated during the cascade.

In operation, in one embodiment of the disclosed methods and systems, the identifying 502 and determining 504 steps are performed by processor(s) 614 of the computing system 602. In one embodiment, the computing system 602 includes processing instructions encoded as software 620 in storage system 616. In one embodiment, software 620 code is stored in non-transitory processor 614-readable storage media in the memory device(s) of storage system 616. In one embodiment, software 620 encoded in the storage system 620 includes a plurality of software 620 modules. In one embodiment, the identifying 502 step is performed by the processor(s) 614 using processing instructions encoded as software 620 in an identifying module 622. In one embodiment, the determining 504 step is performed by the processor(s) 614 using processing instructions encoded as software 620 in a determining module 624.

Figure 9:
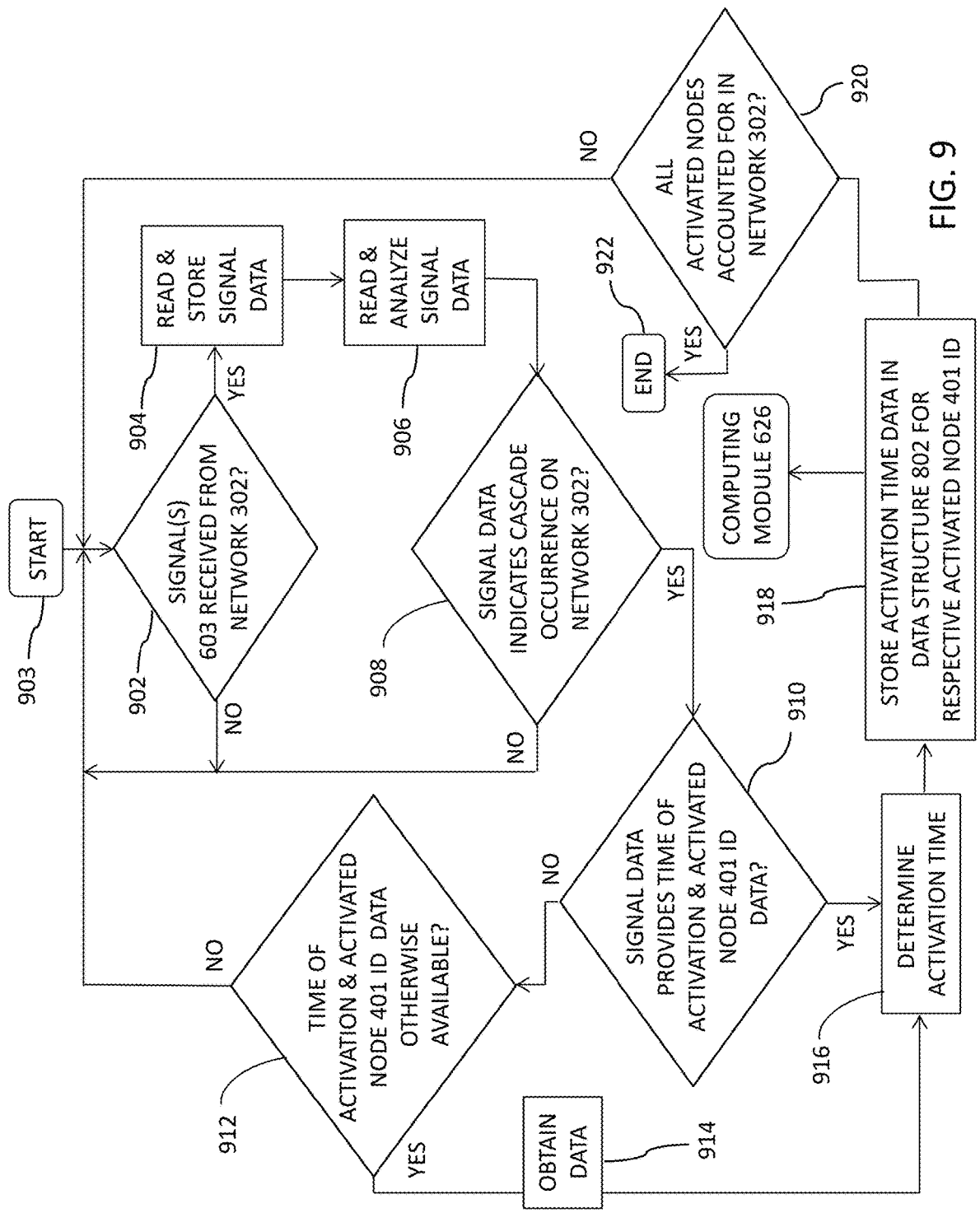
FIG. 9 illustrates a flow chart of operations performed by processor(s) using processing instructions stored as software in memory devices of the computing system of FIG. 6 in an identifying module and a determining module in accordance with one embodiment of the disclosure.

FIG. 9 illustrates a flow chart of operations performed by processor(s) 614 using processing instructions stored as software 620 in the identifying 622 and determining 624 modules. In one embodiment, the processing instructions of identifying module 622 include a first query 902 for the processor(s) 614 to ascertain, including via communication interface 604 and/or input data 612, if signal(s) 603 are received from the network of interest (e.g., network 302). In first query 902, if signal(s) 603 are not received from network 302, then the processor(s) 614 return to a start state 903 to continue to ascertain if signal(s) 603 are received from network 302. In first query 902, if signal(s) 603 are received from network 302, then the processing instructions of identifying module 622 direct the processor(s) 614 to perform a first operation 904 to read and/or store the signal data in memory device(s) of storage system 616 and/or in cache(s) 618. After executing first operation 904, the processing instructions of identifying module 622 direct the processor(s) 614 to perform a second operation 906 to read and/or analyze the signal data.

After processor(s) 614 execute the second operation 906, the processing instructions of identifying module 622 include a second query 908 for the processor(s) 614 to ascertain if the signal data indicates an occurrence of a cascade on network 302. In second query 908, if the signal data does not indicate the occurrence of a cascade on network 302, then the processor(s) 614 return to the first query 902 to continue to ascertain if signal(s) 603 are received from network 302. In second query 908, if the signal data does indicate the occurrence of a cascade on network 302, then the processing instructions of identifying module 622 direct the processor(s) 614 to a third query 910 to ascertain if the signal data provides (e.g., either directly, or indirectly after further processing by processor(s) 614) time of activation and activated node 401 identification (ID) data. In third query 910, if the signal data does not provide time of activation and activated node 401 ID data, the processing instructions of identifying module 622 include a fourth query 912 for the processor(s) 614 to ascertain if time of activation and activated node 401 identification (ID) data is otherwise available (e.g., by contacting individual nodes to obtain the desired data via outgoing inquiry signals 623 from the computing system 602 to network 302). In fourth query 912, if time of activation and activated node 401 ID data is not otherwise available, then the processor(s) 614 return to the first query 902 to continue to ascertain if signal(s) 603 are received from network 302.

In third query 910, if the signal data does provide time of activation and activated node 401 ID data, then the processing instructions of identifying module 622 direct the processor(s) 614 to commence reading and executing the processing instructions of the determining module 624. In fourth query 912, if time of activation and activated node 401 ID data is otherwise available, then the processing instructions of identifying module 622 direct the processor(s) 614 to execute a third operation 914 to obtain those data. After processor(s) 914 execute the third operation 914, the processing instructions of identifying module 622 direct the processor(s) 614 to commence reading and executing the processing instructions of the determining module 624.

The processing instructions of determining module 624 commence with a fourth operation 916 for the processor(s) 614 to determine, based on the signal data, the activation time of the activated node 401 of network 302. In one embodiment, the fourth operation 916 includes further processing by processor(s) 614 to read and/or analyze the signal data in memory device(s) of storage system 616 and/or in cache(s) 618 to thereby determine the activation time. After processor(s) 614 execute the fourth operation 916, the processing instructions of determining module 624 include a fifth operation 918 for the processor(s) 614 to store the activation time data and/or determined values in a data structure 802, as shown in FIG. 8.

After processor(s) 614 execute the fifth operation 918, the processing instructions of determining module 624 direct the processor(s) 614 to commence reading and executing the processing instructions of a computing module 626, as described below. During or after processor(s) 614 execute fifth operation 918, the processing instructions of the determining module 624 include a fifth query 920 for the processor(s) 614 to ascertain if all activated nodes 401 activated during the cascade are accounted for by the computing system 602. In one embodiment of the disclosed methods and systems, the fifth query 920 includes processor(s) 614 reading all data stored in data structure 802 and identifying a presence, or a lack thereof, of missing data as compared to a listing of known network nodes (102 and/or 401) for the network of interest (e.g., network 302). In fifth query 920, if all activated nodes 401 activated during the cascade are not accounted for, then the processing instructions of determining module 624 direct the processor(s) 614 to the first query 902 to continue to ascertain if signal(s) 603 are received from network 302. In fifth query 920, if all activated nodes 401 activated during the cascade are accounted for, then the processing instructions of determining module 624 direct the processor(s) 614 to an end state 922 for the identifying 622 and determining 624 modules of software 620. In one embodiment, the end state 922 returns to the start state 903 upon computing system 602 identifying 502 additional signal(s) 603 from the network of interest (e.g., network 302). In one embodiment, this transition from end state 922 to start state 903 may occur for additional occurrences (e.g., "experiments") of cascades in network 302.

The computing 506 step of method 500 proceeds either concurrently with, or following the identifying 502 and/or determining 504 steps. In one embodiment, the computing 506 step includes computing a connection probability that a pair of activated nodes 401 from the plurality of activated nodes 401 activated during the cascade is connected by an edge 402. In one embodiment, the computing 506 step takes as input the respective activation times determined during the determining 504 step. In this embodiment, the computed connection probabilities for each pairwise combination of activated nodes 401 from the plurality of activated nodes 401 activated during the cascade are based on the activation times determined during the determining 504 step. As signal(s) 603 are received from network 302 at the communication interface 604, processor(s) 614 may mediate storing activation time data for the respective activated nodes 401 in memory device(s) (e.g., non-transitory and/or transitory processor 614-readable data storage media) of a storage system 616 of computing system 602. The storage system 616 may facilitate storing the activation time data in one or more data structures, including, without limitation, data structure 802, as shown in FIG. 8.

In another embodiment, the computing 506 step takes as input the respective activation times determined during the determining 504 step and the forward dynamics rule assigned (e.g., by user 610 as input data 612). In this embodiment, the computed connection probabilities for each pairwise combination of activated nodes 401 from the plurality of activated nodes 401 activated during the cascade are based on both the activation times determined during the determining 504 step and the forward dynamics rule assigned during the assigning step.

In one embodiment of method 500, the computing 506 step includes assigning respective connection weight values to the each pairwise combination, the respective connection weight values equal to respective computed connection probability values for the each pairwise combination. In one embodiment, assigning the respective connection weight values is performed during the computing 506 step. In one embodiment, assigning the respective connection weight values is performed during the mapping 508 step.

Topological Inversion.

The computing 506 step of method 500 facilitates determining at least an approximation of the structure of a network of interest using the activation times for activated nodes 401 during the cascade in the network (e.g., network 302). Underlying the disclosed method is an assumption that an unknown network undergoes cascades numerous times and that respective active times for each activated node 401 in each cascade are available (e.g., by performance of the identifying 502 and determining 504 steps, described above). A directional connection from a first node (i) to a second node (j), and a lack thereof, is denoted as: $\vec{ij}$ and $\vec{\not{ij}}$, respectively.

Bayes theorem is frequently used in inverse problems related to networks. It has been successfully applied in several problems where network properties need to be inferred [12-16]. Bayesian methods have also been used to infer Bayesian networks [21].

Let N and E be the network size and edge number. In the absence of any information, the probability that $\vec{ij}$ for randomly chosen nodes i and j is the fractional edge density (ratio of edges to number of possible edges):

$$P(\vec{ij} \mid \Omega) = \frac{E}{N(N-1)} \equiv \omega$$

where $\Omega$ denotes absence of information.

The Bayes theorem is used to update probabilities when new information arrives. For events A and B, it states that $P(A|B)=P(A|\Omega)P(B|A)/P(B)$. For networks of interest for applying the disclosed methods and systems, when a first cascade occurs, determined data from this first "experiment" provides the time when i and j activate ($E_1$ denote this event), and the Bayes theorem gives us:

$P_{1;i \to j} = \omega P(E_1|\vec{ij})/P(E_1)$ $P(E_1) = \omega P(E_1|\vec{ij}) + (1-\omega)P(E_1|\vec{\not{ij}})$ (2)

These probability values may be updated iteratively as more cascades happen and more pairs of times for the activation of i and j are determined and provided as inputs for the computing 506 step, as follows:

$P_{n;i \to j} = P_{n-1;i \to j} P(E_1|\vec{ij})/P(E_n)$ (3)

where, $P(E_n) = P_{n-1;i \to j} P(E_n|\vec{ij}) + P_{n-1;i \not\to j} P(E_n|\vec{\not{ij}})$, $P_{n;i \to j} = P(\vec{ij}|t_{i;1}, t_{j;1}, t_{i;2}, t_{j;2}, \ldots t_{i;n}, t_{j;n})$, $P_{n;i \not\to j} = 1 - P_{n;i \to j}$ Thus, in one embodiment, method 500 includes an iterating step. The iterating step includes iterating, for a plurality of iterations and for a plurality of cascades, through the identifying 502, the determining 504, and the computing 506 steps. In one embodiment, method 500 further includes iterating, for the plurality of iterations and the plurality of cascades, through the mapping 508 step. In one embodiment, the mapping 508 step includes performing the mapping after completing the plurality of iterations. In one embodiment of the disclosed methods and systems, the iterating step facilitates increasing, as compared to a provided network structure based on a first iteration of the plurality of iterations, an accuracy of the provided network structure during the mapping 508 step.

In one embodiment of the disclosed systems and methods; the identifying 502 step includes, for a first iteration, first identifying an occurrence of a first cascade; and the determining 504 step includes, for the first iteration, first determining a first set of respective activation times for each activated node 401. In the embodiment, method 500 further includes, for at least a second iteration, second identifying an occurrence of at least a second cascade; and for the at least a second iteration, second determining at least a second set of respective activation times for each activated node 401 of the plurality of activated nodes 401 activated during the at least a second cascade. In the embodiment, the computing 506 step includes, for each pairwise combination of activated nodes 401 of the first and the at least a second cascades, computing the connection probability based on the first and the at least a second sets of respective activation times.

For each cascade "experiment," processor(s) 614 access and read activation time data from memory device(s) in storage system 616 during the computing 506 step. In one embodiment of method 500, during the computing 506 step, the processor(s) 614 access and read data for the forward dynamics rule, also stored in the memory device(s) of storage system 616. In one embodiment, processor(s) 614 may access the activation time data and mediate storing it in one or more caches 618. In one embodiment, while processor(s) 614 are performing the computing 506 step to compute the connection probabilities for each pairwise combination of activated nodes for node A of network 302, for instance, processor(s) 614 concurrently access activation time data for node B from storage system 616 and mediate storing it in the cache(s) 618. In one embodiment, including, for example, upon detecting an occurrence of a cascade during the identifying step, processor(s) 614 access forward dynamics rule data from storage system 616 and mediate its storage in the cache(s) 618.

After all cascades ("experiments," including, without limitation, just one cascade occurring in the network of interest—e.g., network 302) are completed, the processor(s) 614 will compute a probability corresponding to each ordered pair of activated nodes 401, P($\vec{ij}$|all data), and, for the mapping 508 step of method 500, choose E edges 402 with the highest probabilities and infer that they must be true edges 404. Thus, in one embodiment of the disclosed systems and methods, method 500 further includes determining, for each activated node having two or more pairwise combinations of activated nodes 401, a greatest computed connection probability from among a plurality of computed connection probabilities. In the embodiment, the mapping 508 step includes mapping the true edge 404 between the two activated nodes based on the determined greatest computed connection probability.

In one embodiment, the computing 506 step includes an intermediate determining step, performed by the processor(s) 614, for determining how the probability that one node 401 activates at $t_1$ and the other at $t_2$ is affected by the presence of a directed edge between the two nodes 401 (e.g., nodes A and B in FIGS. 4A-4D). In one embodiment, this intermediate determining step includes a theoretical method. In another embodiment, this intermediate determining step includes a semi-empirical method.

Theoretical Method.

For the theoretical method, the processor(s) 614 calculate and store in memory device(s) of the storage system 616, at least as an approximation: (i) $P(t_i, t_j | \vec{ij})$; and (ii) $P(t_i, t_j | \vec{\bar{ij}})$, which respectively denote:

(i) an activation probability that a first activated node 401 of the pair of activated nodes 401 and a second activated node 401 of the pair of activated nodes 401 activates at a first time and at a second time, respectively, given that the first and second activated nodes 401 have the edge between them; and (ii) an activation probability that the first activated node 401 of the pair of activated nodes 401 and the second activated node 401 of the pair of activated nodes 401 activates at the first time and at the second time, respectively, given that the first and second activated nodes 401 do not have the edge between them, and where the second time occurs after the first time.

Let $\vec{ij}$, and j have an indegree k. At a time step when i is inactive, j has a total of k−1 provider nodes which could possibly have activated. Assuming all of them to be equivalent (i.e. equally likely to have activated), the probability that m of those providers have activated at the given time will be a binomial distribution.

After i has activated, there are still k−1 providers to choose from but there is an extra node which has activated. So the probability that j is active is given by $$Q_j(t) = \sum_k \Gamma(k) \sum_{m=0}^{k-1} B(m, k-1, Q(t-1)) h(t) \quad (4)$$

where, $$h(t) = \begin{cases} f(m/k) & t \leq t_i \\ f((m+1)/k) & t > t_i \end{cases} \quad (5)$$

In calculating $P(t_i, t_j | \vec{ij})$, the processor(s) 614 compute, and store a resulting value in storage system 616 and/or cache(s) 618, of the probability that j activates exactly at $t_j$, which is equal to the difference of the probabilities that j is not active at $t_j-1$ and the probability that it is active at $t_j$. That difference value is stored in storage system 616 and/or cache(s) 618, and then processor(s) 614 multiple that quantity by the probability that i activates at $t_i$.

$$P(t_i, t_j | \vec{ij}) = P(t_j | \vec{ij} \cap t_i) P(t_i)$$

$$P(t_i, t_j | \vec{ij}) = D(t_i)[(Q_j(t_j) - Q_j(t_j - 1))]$$

Since the activation time of each activated node 401 in each cascade is known from the determining step 504 of method 500, D(t) and Q(t) is obtained by simply counting, by the processor(s) 614, the number of activations at that time.

As the number of nodes of networks increase, the activation of two arbitrarily chosen nodes at two different times become more and more independent, at least as an approximation. So, $P(t_1, t_2) \approx D(t_1) D(t_2)$ for two times $t_1$ and $t_2$. This fact is taken advantage of by processor(s) 614 to obtain $P(t_i, t_j | \vec{\bar{ij}})$, which is required in the Bayes' theorem (Eqn. (3)), as follows:

$$D(t_i) D(t_j) = \omega P(t_i, t_j | \vec{ij}) + (1-\omega) P(t_i, t_j | \vec{\bar{ij}})$$

Then, these two P values $P(t_i, t_j | \vec{ij})$ and $P(t_i, t_j | \vec{\bar{ij}})$, calculated by the processor(s) 614 and stored in memory devices of the storage system 616, may be accessed and read by processor(s) 614 for purposes of computing the connection probabilities of the network of interest (e.g., network 302) in the computing 506 step. In one embodiment, processor(s) 614 may use the two calculated P values for purposes of calculating the values provided by Eqn. (1) and Eqn. (2), above, for the computing 506 and mapping 508 steps of method 500.

In summary, in one embodiment of the disclosed systems and methods having the intermediate determining step of the computing 506 step embodied in the theoretical method, the computing 506 step includes calculating, for the each pairwise combination: an activation probability that a first node of the pair of nodes and a second node of the pair of nodes activates at a first time and at a second time, respectively, given that the first and second nodes have the edge between them. In another embodiment of the disclosed systems and methods having the intermediate determining step of the computing 506 step embodied in the theoretical method, the computing 506 step includes calculating, for the each pairwise combination: an activation probability that a first node of the pair of nodes and a second node of the pair of nodes activates at a first time and at a second time, respectively, given that the first and second nodes do not have the edge between them. In yet another embodiment of the disclosed systems and methods having the intermediate determining step of the computing 506 step embodied in the theoretical method, the computing 506 step includes calculating, for the each pairwise combination, both of: $P(t_i, t_j | \vec{ij})$ and $P(t_i, t_j | \vec{\bar{ij}})$. In these embodiments, the computing 506 step includes computing the connection probability based on the calculated activation probabilities.

Semi-Empirical Method.

For the semi-empirical method, approximations of $P(t_i, t_j | \vec{ij})$ and $P(t_i, t_j | \vec{\bar{ij}})$, defined above with reference to the theoretical method, are obtained from a surrogate network generated by the computing system 602 at the direction of the user 610. The surrogate network has a plurality of surrogate nodes. In one embodiment, the surrogate network may have similar statistical properties as the network of interest (i.e., an actual network, e.g., network 302). In one embodiment, the surrogate network is a random network.

For one or more cascade "experiments" (e.g., simulations), the computing system 602 and/or the user 610 may determine and/or measure the activation probabilities $P(t_i, t_j | \vec{ij})$ and $P(t_i, t_j | \vec{\bar{ij}})$ on the generated surrogate network for all times, including, without limitation, the first and second times. Then, these two activation probability values determined and/or measured from the surrogate network may be stored in memory device(s) of the storage system 602, where they may be accessed and read by processor(s)

614 for purposes of computing the connection probabilities of the actual network of interest (e.g., network 302) during the computing step 506 of method 500. In one embodiment, processor(s) 614 may use the surrogate network-determined activation probability values for purposes of calculating the values provided by Eqn. (1) and Eqn. (2), above, for the computing 506 and mapping 508 steps. A surrogate network with the same indegree distribution as that of the unknown network can be easily generated by starting with an empty network and adding random edges to every surrogate node one by one until the exact desired degree distribution (Γ(k)) is reached.

In summary, in one embodiment of the disclosed systems and methods having the intermediate determining step of the computing 506 step embodied in the semi-empirical method, the disclosed methods and systems (e.g., method 500) includes: a generating step including generating a surrogate network; a simulating step including simulating the occurrence of the cascade amongst a plurality of surrogate nodes of the surrogate network; and a determining step including determining, based on the data (e.g., activation time data of activated surrogate nodes), the two activation probabilities $P(t_i,t_j|\vec{ij})$ and $P(t_i,t_j|\vec{\theta})$, as defined above with respect to the theoretical method. In the semi-empirical method, these two activation probability values are determined using surrogate network-obtained activation times, as opposed to the theoretical method, where the values of these two activation probabilities are calculated using activation times of activated nodes 401 of the actual network of interest (e.g., network 302). The semi-empirical method-determined activation probabilities are then utilized during the computing 506 step of method 500 for computing the connection probability values for that actual network of interest (e.g., network 302).

In operation, in one embodiment of the disclosed methods and systems, the computing 506 and mapping 508 steps are performed by processor(s) 614 of the computing system 602. In one embodiment, the software 620 encoded in the storage system 620 includes a computing module 626 and a mapping module 628. In one embodiment, the computing 506 step is performed by the processor(s) 614 using processing instructions encoded as software 620 in the computing module 626. In one embodiment, the mapping 508 step is performed by the processor(s) 614 using processing instructions encoded as software 620 in the mapping module 628.

Figure 10:
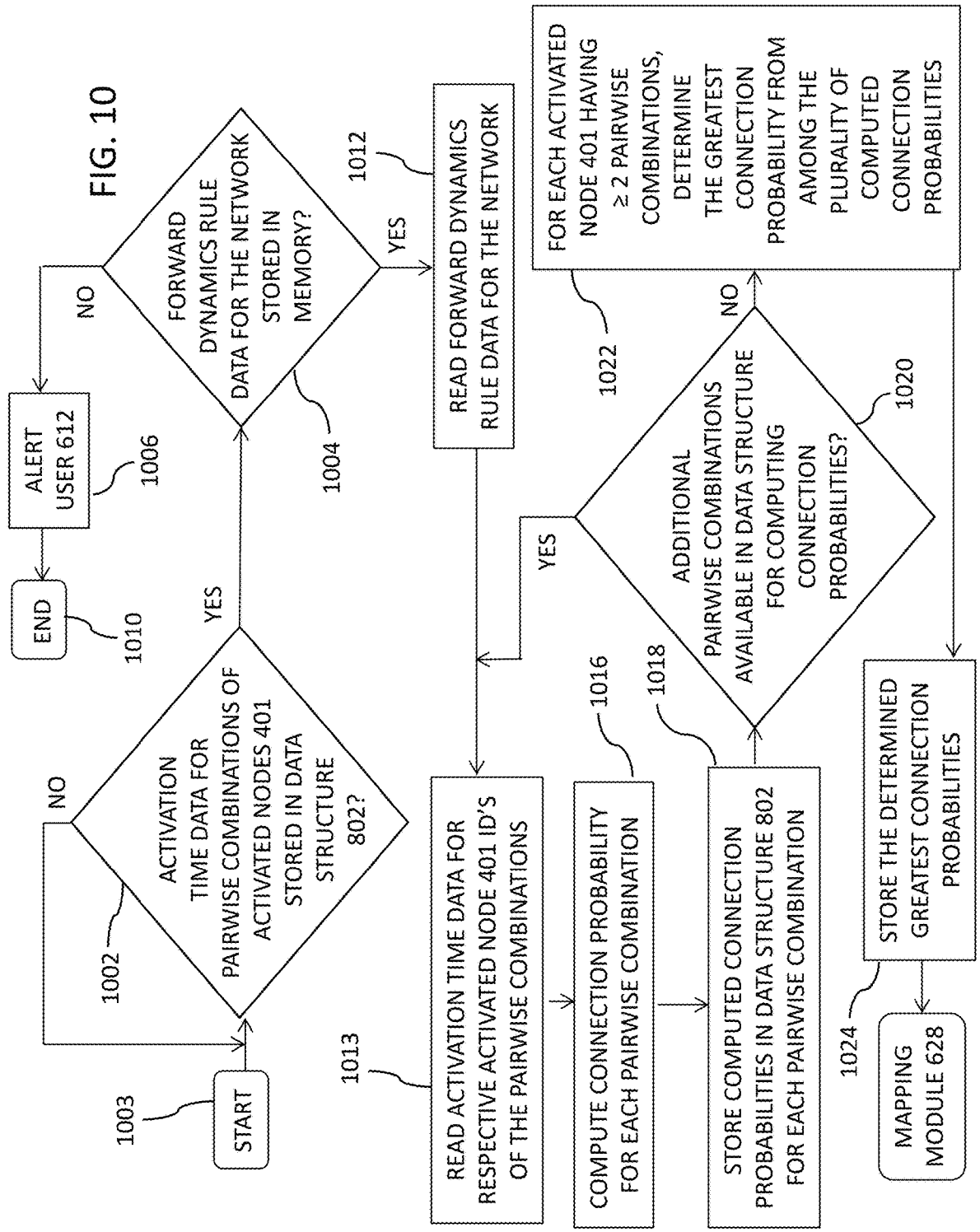
FIG. 10 illustrates a flow chart of operations performed by processor(s) using processing instructions stored as software in memory devices of the computing system of FIG. 6 in a computing module in accordance with one embodiment of the disclosure.
Figure 11:
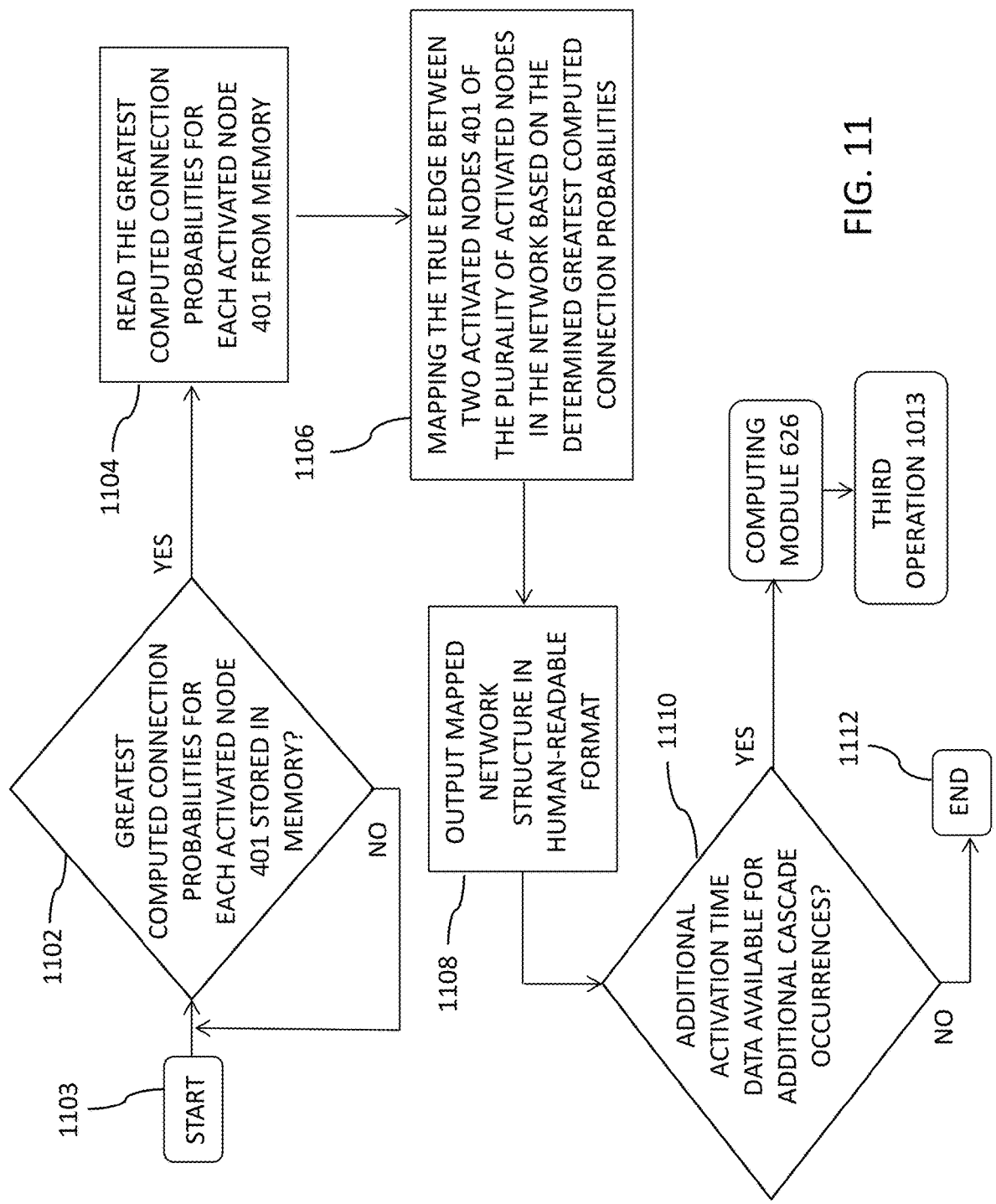
FIG. 11 illustrates a flow chart of operations performed by processor(s) using processing instructions stored as software in memory devices of the computing system of FIG. 6 in a mapping module in accordance with one embodiment of the disclosure.
Figure 12A:
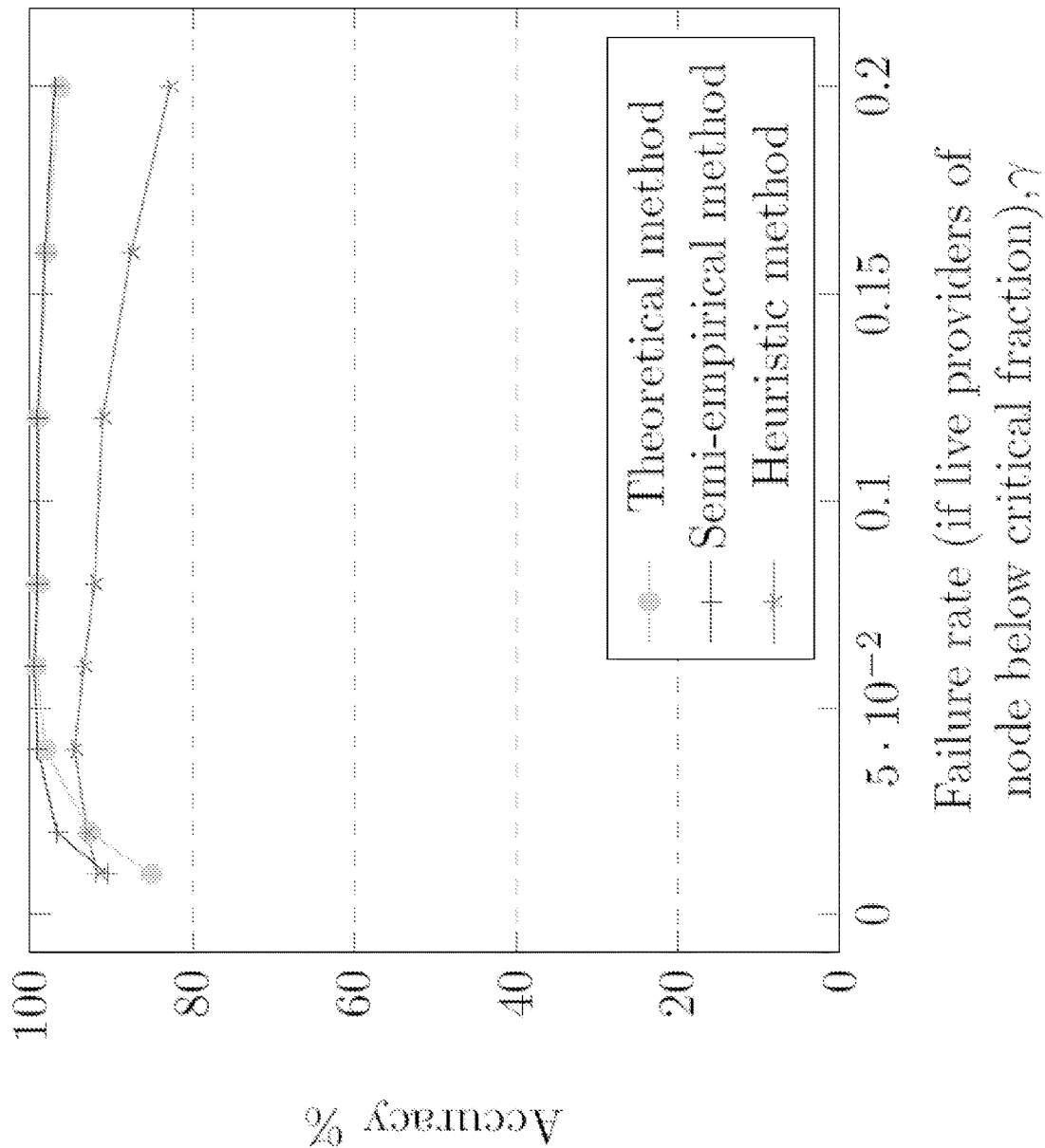
FIGS. 12A-12D illustrate accuracies (%) of provided network structures plotted against varied forward dynamics rule parameters for an example application of the disclosed methods and systems.
Figure 12B:
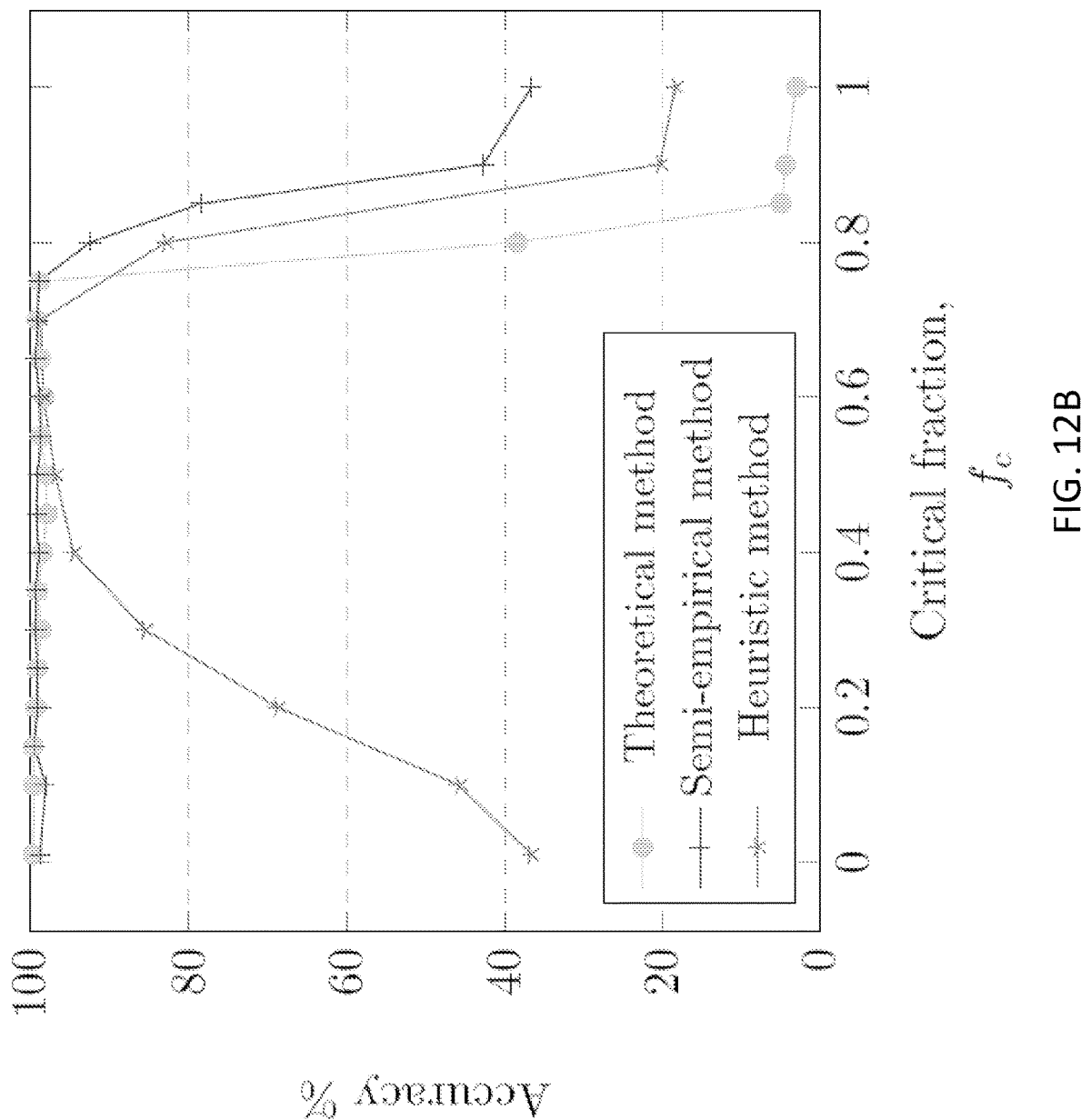
Figure 12C:
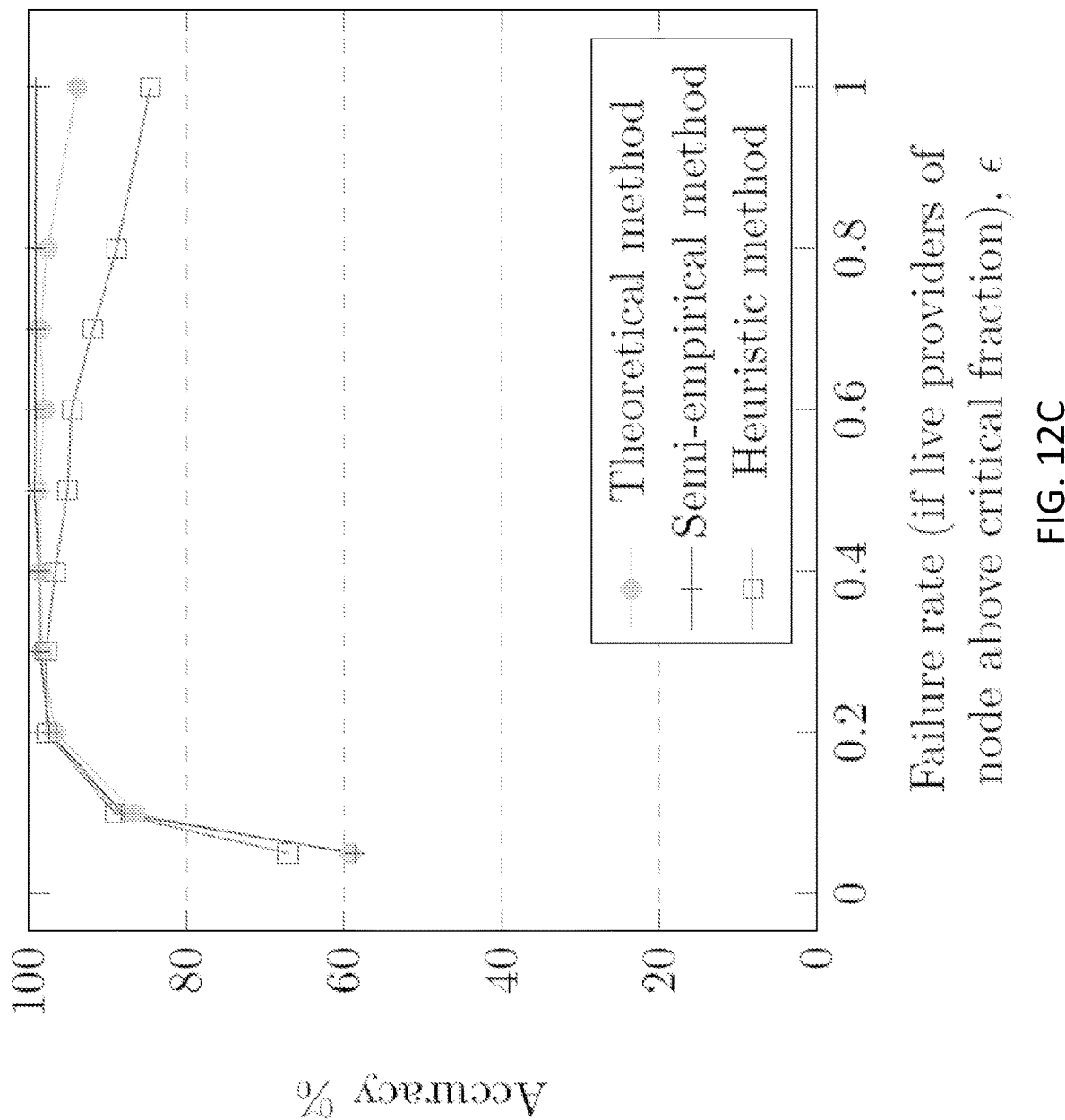
Figure 12D:
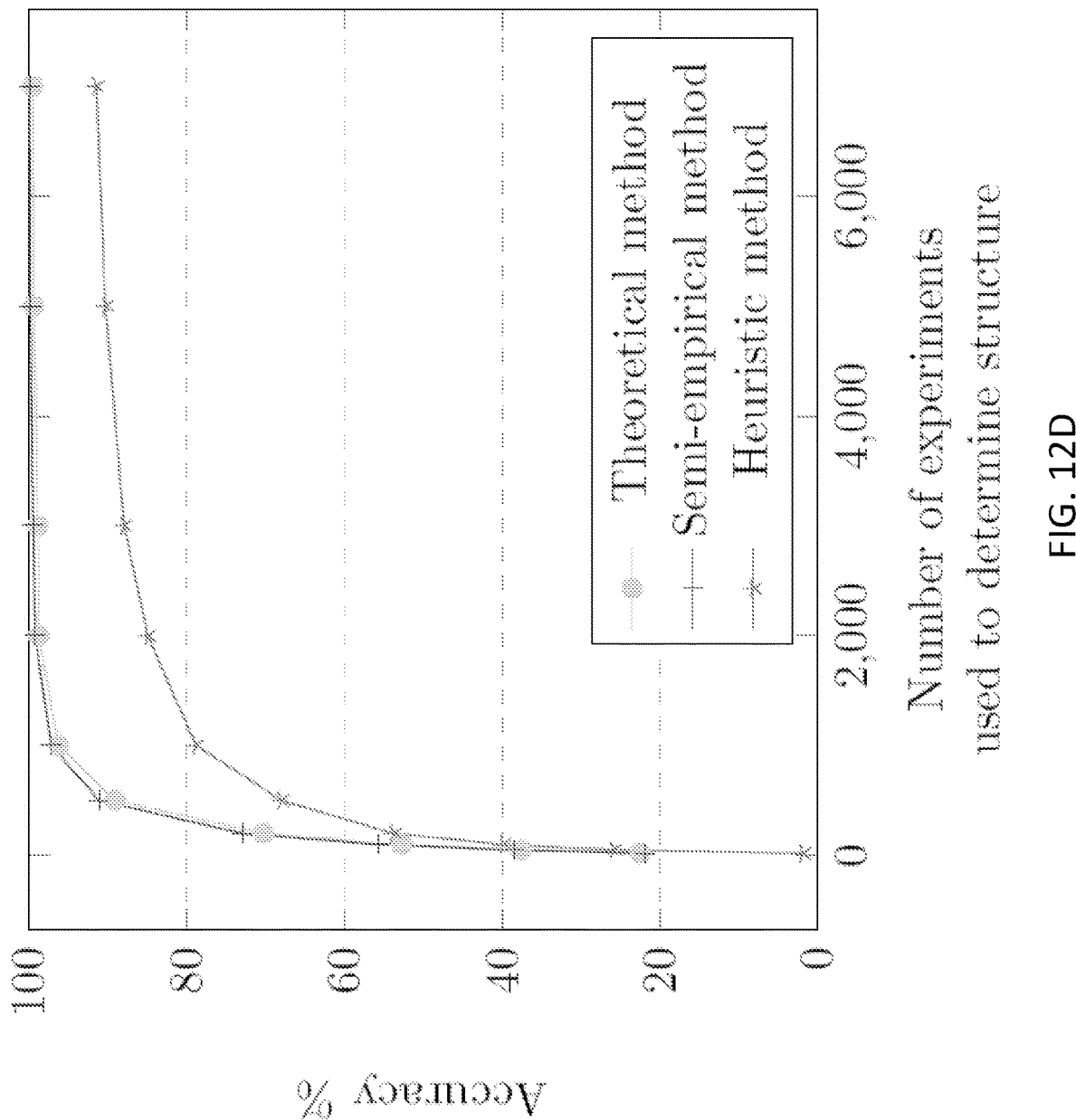

FIGS. 10 and 11 illustrate flow charts of operations performed by processor(s) 614 using processing instructions stored as software 620 in the computing 626 and mapping 628 modules, respectively. In one embodiment, the processing instructions of computing module 626 include a first query 1002 for the processor(s) 614 to ascertain, through reading and/or analyzing data stored in memory device(s) of storage system 616 and/or cache(s) 618, if activation time data is stored in data structure 802 and/or available for further processing. In first query 1002, if activation time data is not stored in data structure 802 and/or is not available for further processing, then the processor(s) 614 returns to a start state 1003 to continue to ascertain if activation time data is stored in data structure 802 and/or available for further processing. In first query 1002, if activation time data is stored in data structure 802 and/or is available for further processing, then the processing instructions of computing module 626 direct the processor(s) 614 to a second query 1004.

In second query 1004, the processing instructions of computing module 626 direct processor(s) 614 to ascertain, through reading and/or analyzing data stored in memory device(s) of storage system 616 and/or cache(s) 618, if forward dynamics rule data for the network of interest (e.g., network 302) is stored in memory device(s) of storage system 616 and/or is available for further processing. In second query 1004, if forward dynamics rule data for the network of interest (e.g., network 302) is not stored in memory device(s) of storage system 616 and/or is not available for further processing, then the processing instructions of computing module 626 direct processor(s) 614 to execute a first operation 1006 to transmit an alert to user 610 of computing system 602 to inform user 610 of the absence of forward dynamics rule data. After processor(s) 614 execute the first operation 1006, the processing instructions of the computing module 626 direct the processor(s) 614 to an end state 1010 for the computing module 626 of software 620. In one embodiment, the end state 1010 returns to the start state 1003 upon computing system 602 identifying that forward dynamics rule data has been input into computing system 602 (e.g., as input data 612 by user 610). In second query 1004, if forward dynamics rule data for network 302 is stored in memory device(s) of storage system 616 and/or is available for further processing, then the processing instructions of computing module 626 direct processor(s) 614 to execute a second operation 1012 to read the forward dynamics rule data from memory device(s) of storage system 616 and/or cache(s) 618.

After processor(s) 614 execute the second operation 1012, the processing instructions of the computing module 626 direct the processor(s) 614 to execute a third operation 1013 to read the activation time data for respective activated node 401 ID's of the pairwise combinations. After processor(s) 614 execute the third operation 1013, the processing instructions of the computing module 626 direct the processor(s) 614 to execute a fourth operation 1016 to compute the connection probability for each pairwise combination. In one embodiment, the fourth operation 1016 includes the intermediate determining step of method 500 embodied in the theoretical method, as described above. In another embodiment, the fourth operation includes the intermediate determining step of method 500 embodied in the semi-empirical method, as described above. In either case, in one embodiment, for the fourth operation 1016, processor(s) 614 compute the connection probabilities for each of the pairwise combinations based on the activation time data, the forward dynamics rule data, and the two activation probabilities, namely: $P(t_i,t_j|\vec{ij})$ and $P(t_i,t_j|\vec{\theta})$.

After processor(s) 614 execute the fourth operation 1016, the processing instructions of the computing module 626 direct the processor(s) 614 to execute a fifth operation 1018 to store the computed connection probabilities in data structure 802 for each pairwise combination and each respective activated node 401 ID. In one embodiment, the processing instructions of computing module 626 include a third query 1020 for the processor(s) 614 to ascertain, through reading and/or analyzing data stored in memory device(s) of storage system 616 and/or cache(s) 618, if additional pairwise combinations are available in data structure 802 for processor(s) 614 to compute connection probabilities. In third query 1020, if additional pairwise combinations are not available in data structure 802 for processor(s) 614 to compute connection probabilities, then the processing instructions of computing module 626 direct the processor(s) 614 to execute a sixth operation 1022. For sixth operation 1022, and for each activated node 401 having two or more pairwise combinations stored in data structure 802, the processor(s) 614 determine the greatest connection probability value from among the plurality of computed connection probabilities. After processor(s) 614 execute the sixth operation 1022, the processing instructions of the computing module 626 direct the processor(s) to execute a seventh operation 1024 for the processor(s) 614 to store the greatest connection probabilities determined in the sixth operation 1022 in memory device(s) of the storage system 616 and/or cache(s) 618.

After processor(s) 614 execute the seventh operation 1024, the processing instructions of computing module 626 direct the processor(s) 614 to commence reading and executing the processing instructions of a mapping module 626, as described below. In third query 1020, if additional pairwise combinations are available in data structure 802 for processor(s) 614 to compute connection probabilities, then the processing instructions of computing module 626 direct the processor(s) 614 to execute the sixth operation 1013 and subsequent operations (1016, 1018) until the third query 1020 is again reached in computing module 626.

The processing instructions of the mapping module 628 commence with a first query 1102 for the processor(s) 614 to ascertain if values for greatest computed connection probabilities for each activated node 401 are stored as data in memory device(s) of storage system 616 and/or cache(s) 618. In first query 1102, if values for greatest computed connection probabilities for each activated node 401 are not stored as data in memory device(s) of storage system 616 and/or cache(s) 618, then the processing instructions of mapping module 628 direct the processor(s) 614 to the first query 1102 to continue to ascertain if values for greatest computed connection probabilities for each activated node 401 are stored as data in memory device(s) of storage system 616 and/or cache(s) 618. In first query 1102, if values for greatest computed connection probabilities for each activated node 401 are stored as data in memory device(s) of storage system 616 and/or cache(s) 618, then the processing instructions of mapping module 628 direct the processor(s) 614 to execute a first operation 1104 to read the greatest computed connection probabilities for each activated node 401 from the memory device(s) of storage system 616 and/or cache(s) 618.

After processor(s) 614 execute the first operation 1104, the processing instructions of the mapping module 628 direct the processor(s) 615 to execute a second operation 1106. In the second operation 1106, the processor(s) 614 map the true edge 404 between two activated nodes 401 of the plurality of activated nodes 401 in the network based on the determined greatest computed connection probabilities determined as described above with reference to the computing module 626 shown in FIG. 10. After processor(s) 614 execute the second operation 1106, the processing instructions of the mapping module 628 direct the processor(s) to execute a third operation 1108 to output a mapped network structure (e.g., of network 302) in a human-readable format. In one embodiment, the third operation 1108 includes processor(s) 614 outputting the mapped network structure of network 302 for viewing on a display device (e.g., monitor) coupled to the computing system 602. In one embodiment, the third operation 1108 includes processor(s) 614 outputting the mapped network structure of network 302 for printing by a printer device coupled to the computing device 602. In one embodiment, the third operation 1108 includes processor(s) 614 outputting the mapped network structure of network 302 for viewing as a file on the display device. In one embodiment, the third operation 1108 includes processor(s) transmitting the mapped network structure data (e.g., via wireless data transmission and/or via wired data transmission) to a location distal the computing system 602 for viewing at some location other than the computing system 602.

After processor(s) 614 execute the third operation 1108, the processing instructions of the mapping module 628 direct the processor(s) 614 to a second query 1110 for the processor(s) 614 to ascertain if additional activation time data is stored and/or otherwise available in memory device(s) of storage system 616 and/or cache(s) 618 for additional cascade occurrences in the network of interest (e.g., network 302). In second query 1110, if additional activation time data is not stored and/or otherwise available in memory device(s) of storage system 616 and/or cache(s) 618, then the processing instructions of mapping module 628 direct the processor(s) 614 to an end state 1112 of the mapping module 628. In second query 1110, if additional activation time data is stored and/or otherwise available in memory device(s) of storage system 616 and/or cache(s) 618, then the processing instructions of mapping module 628 direct the processor(s) 614 to commence reading and executing the processing instructions of the third operation 1013 of the computing module 626.

As described in U.S. Provisional Patent Application No. 62/461,912 and Sushrut Ghonge and Dervis Can Vural, *Inferring Network Structure from Cascades*, Physical Review E 96, 012319 (2017) (hereinafter referred to as the "2017 Paper"), when the degree distribution ($\Gamma(k)$) for the network of interest (e.g., network 302) is not known, its edges can be considered to be pairs of random variables. Some methods have been developed to infer network structures by finding joint information or correlation between these variables [10]. Observations such as these may be exploited, since if a node activates at some time, it is quite likely that one or more of its providers activated just before it. As such, a heuristic method may be employed as a part of the disclosed methods and systems by determining how often one node activates right after another in time, and choosing the edges between nodes with the highest number of such consecutive activations.

In one embodiment, the degree distribution $\Gamma(k)$ for a network of interest (e.g., network 302) for which $\Gamma(k)$ is not known may be determined at least approximately using the heuristic method. In one embodiment, the heuristic method may utilize a computer-simulated network to determine $\Gamma(k)$ for the surrogate network (e.g., for method 500 including, without limitation, the semi-empirical method embodiment of the intermediate determining step) and/or for the network of interest (e.g., for method 500 including, without limitation, the theoretical method embodiment of the intermediate determining step). In one embodiment, the network for which the heuristic method determines $\Gamma(k)$ for is a random network. In one embodiment, this heuristic method-determined $\Gamma(k)$ is assigned to the network of interest. In one embodiment, assigning $\Gamma(k)$ to the network of interest for which $\Gamma(k)$ is not known may increase an accuracy of the provided network structure as compared to a provided network structure without assigning the using the $\Gamma(k)$, including, without limitation, embodiments for which the intermediate determining step includes the theoretical method or the semi-empirical method. Instead of, or in addition to, using the heuristic method for determining $\Gamma(k)$ as described above, the heuristic method may be employed as a standalone method executed by computing system 602 for a network of interest (e.g., network 302) to infer its network structure in an at least approximate manner, as discussed in the examples provided below (e.g., as shown and described below with reference to FIGS. 12A-12D and 13A-13C). When it is used in this way, the heuristic method does not require knowledge of the Γ(k) of the network of interest and does not require using Bayes theorem according to the discussion provided above.

The above disclosed methods and system are further detailed in the 2017 Paper and its Supplemental Material. The 2017 Paper and its Supplemental Material are both incorporated by reference herein in their entirety.

Examples

The accuracy of the disclosed systems and methods were tested using simulations of various forward dynamics rule models on known synthetic and real networks and used the activation time of nodes from the simulations as if experimental data. Network structures provided by the disclosed systems and methods were then compared to the actual ones.

As a first example, a generalized version of [8] was inverted such that $f(m/k)=\gamma$ if $m/k<f_c$ and $\varepsilon$ if $m/k \geq f_c$. In other words, a node changes its activation probability if more than a critical number of providers activate. For the example, all forward dynamics rule mode parameters were varied, and the resulting accuracies are plotted in FIGS. 12A-12D. We varied all model parameters for this example and plotted our accuracy in FIGS. 12A-12D. For FIG. 12A $\gamma$ (failure rate (if live providers of node below critical fraction $f_c$)) was varied, for FIG. 12B critical fraction ($f_c$) was varied, for FIG. 12C $\varepsilon$ (failure rate (if live providers of node above critical fraction ($f_c$)) was varied, and for FIG. 12D the number of experiments used to determine network structure was varied. The success rate using embodiments of the disclosed methods and systems (e.g., theoretical method of the intermediate determining step, discussed above; semi-empirical method of the intermediate determining step, discussed above; and the heuristic method, discussed above) are plotted in FIGS. 12A-12D. The forward dynamics rule model used for this example was a threshold model, where $f(m/k)$ is equal to $\gamma$ for $m/k<f_c$, and $\varepsilon$ when $m/k>f_c$. The parameter space was swept and success rates plotted as a function $\gamma$, $\varepsilon$, $f_c$, (while keeping the other two constant at $\gamma=0.04$, $\varepsilon=0.6$, $f_c=0.4$). For all runs the edges and network size are E=1484 and N=200. The number of experiments (cascades) was 2000 for semi-empirical and theoretical methods, except for FIG. 12D where accuracy (%) is plotted versus number of experiments. For the heuristic method, the number of experiments is appropriately chosen according to the plot of FIG. 12D to provide high accuracy. In addition to this example using the above-discussed threshold model for the forward dynamics rule, other forward dynamics rule models were also evaluated (without varying all possible parameters of these models) and are discussed below with reference to Table 1.

Figure 13A:
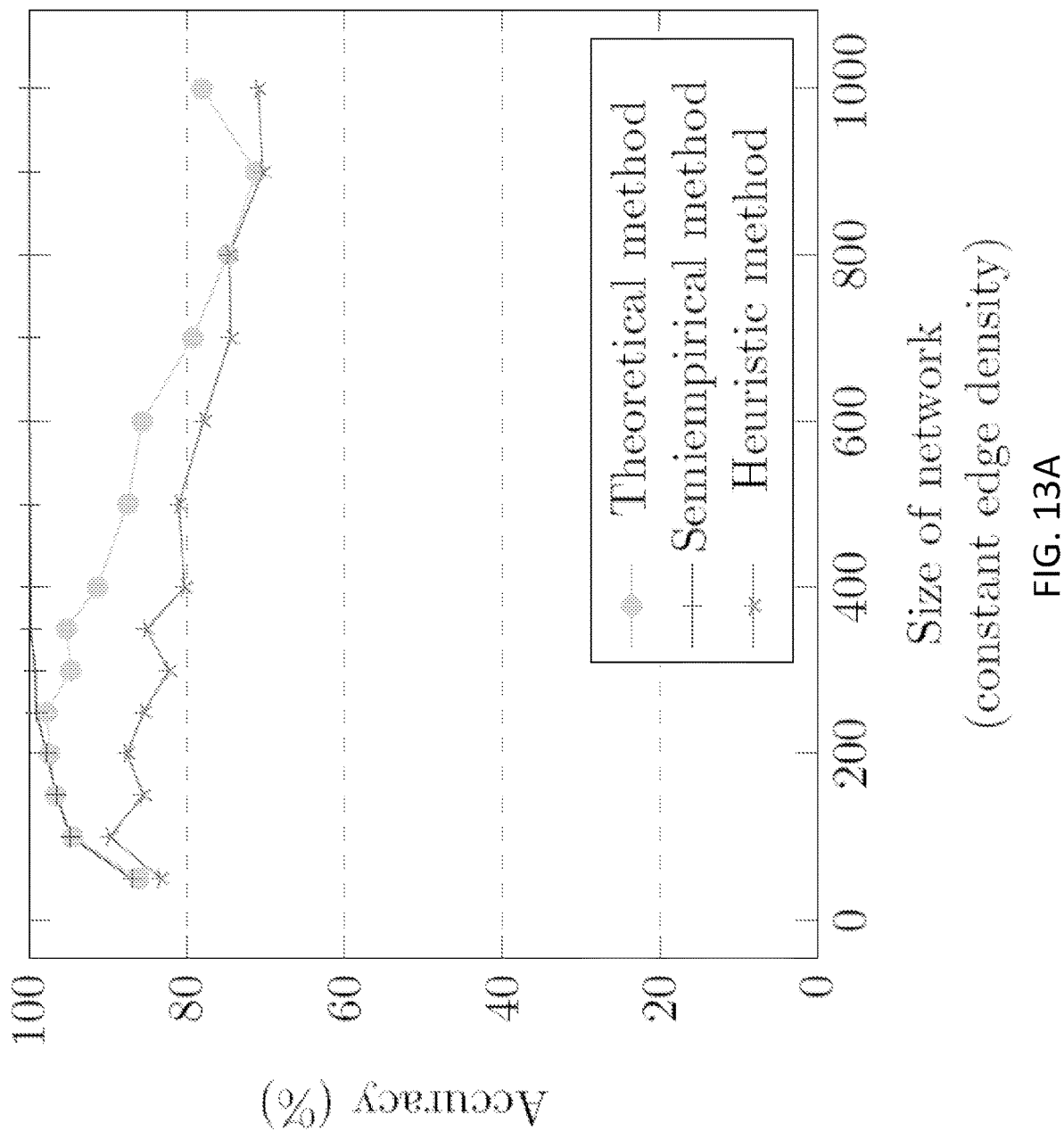
FIGS. 13A-13C illustrate accuracies (%) of provided network structures plotted against varied network characteristics for network size, number of nodes, and number of edges for the example application of the disclosed methods and systems shown in FIGS. 12A-12D.
Figure 13B:
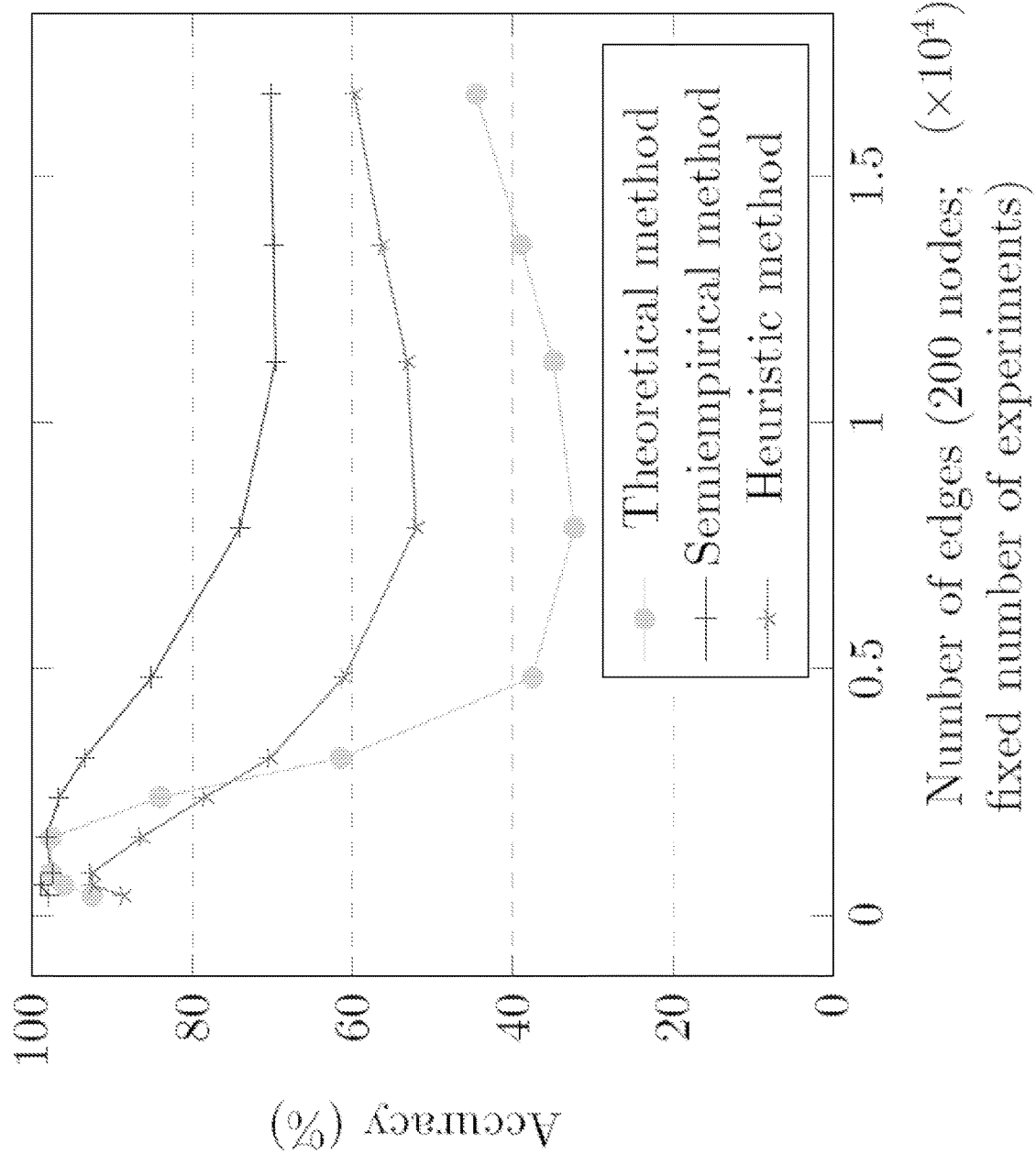
Figure 13C:
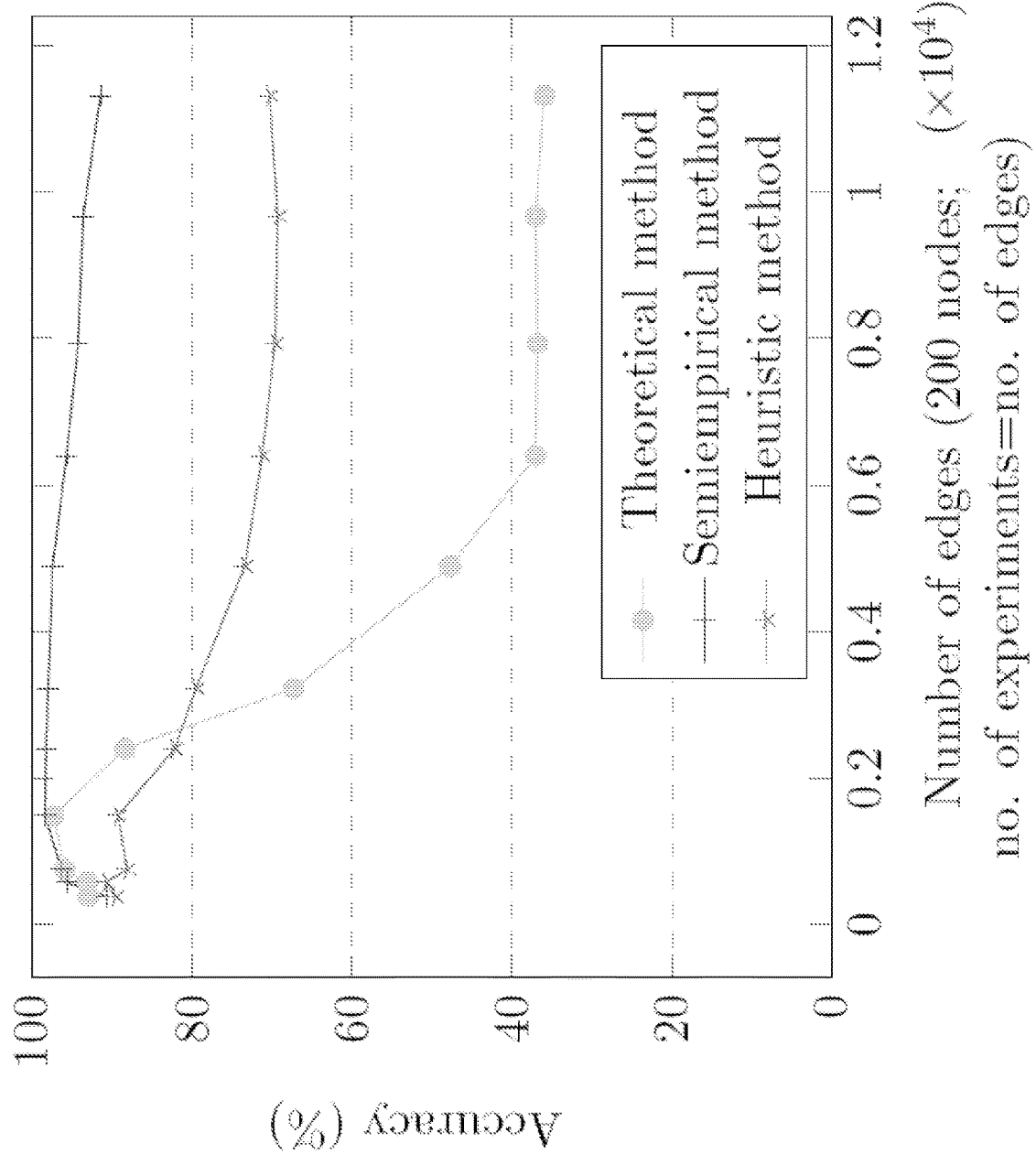

FIGS. 13A-13C illustrate plots showing the effects of varying the size of the network and the number of edges for the example discussed above with reference to FIGS. 12A-12D. FIGS. 13A-13C demonstrate the scalability of the disclosed methods and systems. For the specific example forward dynamics model used for FIGS. 12A-12D, success rates in accuracy (%) measures were evaluated for networks of various sizes and densities. The threshold forward dynamics rule model with $f_c=0.4$, $\gamma=0.04$, and E=0.6 was used for cascades. The number of experiments (cascades) is 1600 for FIG. 13A, is equal to the number of edges in FIG. 13B, and is equal to 0.4 times the number of possible edges—i.e., 0.4N (N−1)—in FIG. 13C. Edge density was fixed at 4% in the FIG. 13C plot.

In all plots (FIGS. 12A-12D and 13A-13C) and tables discussed herein with respect to the examples provided, the reported accuracy (%) results are not reported accuracies as defined by the fraction of correctly identified connectivity matrix elements (e.g., of a mapped network structure for a network of interest), but rather as a fraction of correctly identified edges in the network of interest. For example, in a network of 100 nodes and 100 edges, it must be decided whether ~$10^4$ entries of the connectivity matrix is a 0 or 1. If 10 false edges were identified (and hence, also 10 true edges were not identified), the reported accuracy (%) would be 90/100=90% instead of 9980/$10^4$=99.8%. In addition to the threshold forward dynamics rule model discussed with reference to the first provided example, above, other forward dynamics rule models (without varying all possible parameters of these models) were evaluated. For these additional examples, success rates are reported in Table 1, which lists accuracy (%) of inversion for some general models of the kind $f(m/k)=0.04+0.96$ $g(m/k)$, for N=200, E=1563, obtained from 2000 cascades on a random network.

TABLE 1

| g(m/k) | Theoretical (Theo.) | Semi-Empirical (SE) | Heuristic (Heur.) |
|---|---|---|---|
| m/k | 98.78 | 99.12 | 95.05 |
| (m/k)² | 95.89 | 99.12 | 95.96 |
| 1 − (1 − m/k)² | 99.66 | 99.80 | 90.36 |
| 1 − exp(−m/k) | 97.71 | 97.57 | 88.54 |
| 1 − exp(−3 m/k) | 99.80 | 99.73 | 81.67 |

In another example, synthetic data was used to infer friendships between inmates of the Gagnon and Macrae prison. This network consists of 67 prisoners (nodes) which have 182 friendships (edges) [22]. Success rates are reported in Table 2, which lists accuracy (%) of inference for the Gagnon and Macrae prison network: N=67, E=182, for when: $f(m/k)$ is a step function (threshold forward dynamics rule model) with lower value $\gamma=0.04$, higher value $\varepsilon=0.6$ and threshold point $f_c=0.4$ (left "Threshold Model" columns), and for when: $f(m/k)=0.04+0.96$ m/k (right "g(m/k)=m/k" columns).

TABLE 2

| | Threshold Model | | | g(m/k) = m/k | | |
|---|---|---|---|---|---|---|
| Experiments | Theo. | Semi-Emp. | Heur. | Theo. | Semi-Emp. | Heur. |
| 20 | 59.34 | 64.84 | 0 | 48.90 | 63.74 | 0 |
| 50 | 78.02 | 80.22 | 0 | 70.33 | 79.67 | 45.05 |
| 100 | 84.62 | 84.62 | 73.63 | 78.57 | 87.36 | 68.68 |
| 200 | 86.81 | 85.16 | 76.92 | 89.01 | 91.76 | 84.62 |
| 500 | 88.46 | 88.46 | 85.71 | 90.11 | 91.21 | 86.26 |

In yet another example, the disclosed methods and systems were used on some undirected graphs such as the Zachary's Karate club network [23]. This network has 34 karate club members (nodes) and has 156 friendships (edges) between members. In this example, the simulated experiments resembled studying the spread of opinions and practices among friends. $\gamma$ is included to represent opinion formation due to factors other than friends. For this example, success rates are reported in Table 3, which lists accuracy (%) of inference for Zachary's Karate club network: N=34, E=156, $\gamma=4\%$, $\varepsilon=0.6$, $f_c=0.4$.

TABLE 3

| Experiments | Theoretical | Semi-Empirical | Heuristic |
|---|---|---|---|
| 100 | 64.74 | 79.49 | 63.78 |
| 200 | 65.38 | 84.61 | 69.23 |
| 500 | 69.87 | 85.90 | 73.72 |
| 1000 | 72.75 | 85.90 | 76.28 |

Several physicians were surveyed in [24] and [25] to study how information about a new medicine spreads among physicians that have friendly discussions or take professional advice. This was later modeled as a network problem in [26], and effects of marketing were studied in [27]. In yet another example, we utilized γ to simulate the effect of marketing, and the jump at $f_c$ assumes that a physician starts prescribing a medicine with an increased probability E if their colleagues prescribe it. The results of inferring physicians' relationships with their colleagues using synthetic data of cascades (i.e., medicine prescriptions) is given in Table 4, which lists accuracy (%) of inference for physician networks (N=246): Threshold forward dynamics rule model with ε=0.6, $f_c$=0.4 γ=4%.

TABLE 4

| | Advice, E = 480 | | Discussion, E = 565 | |
|---|---|---|---|---|
| Experiments | Theoretical | Semi-Empirical | Theoretical | Semi-Empirical |
| 25 | 56.67 | 62.08 | 55.40 | 59.29 |
| 50 | 73.12 | 78.33 | 72.92 | 74.69 |
| 100 | 82.92 | 83.12 | 82.83 | 83.36 |
| 200 | 87.92 | 88.12 | 89.03 | 87.61 |
| 500 | 92.71 | 71.45 | 92.92 | 83.62 |

Although one network of interest (e.g., network 302) may be used in the disclosed systems and methods, and in the examples discussed above, persons skilled in the art will recognize and appreciate that network structures of a plurality of networks of interest may be simultaneously provided using the disclosed methods and systems. In addition to, or instead of, providing network structures a plurality of networks of interest, the methods and systems disclosed herein may be utilized to determine a degree of similarity between provided network structures of two of more networks, as for example, to ascertain if the two or more networks of interest share particular attributes and/or characteristics in common.

What is claimed is:

1. A method executed on a computing device to provide a network structure for a network, said method comprising:
   identifying an occurrence of a cascade amongst a plurality of nodes of the network;
   determining respective activation times for each node of a plurality of activated nodes activated during the cascade;
   for each pairwise combination of activated nodes from the plurality of activated nodes, computing, based on the respective activation times, a connection probability that a pair of nodes from the plurality of activated nodes is connected by an edge; and
   mapping a true edge between two activated nodes of the plurality of activated nodes in the network based on computed connection probabilities for the each pairwise combination.

2. The method of claim 1 further comprising assigning to the network a forward dynamics rule by which the cascade propagates amongst the plurality of nodes of the network, wherein the computing includes computing the connection probability based on the assigned forward dynamics rule.

3. The method of claim 2, wherein the assigning includes assigning the forward dynamics rule based on an activation dependence of the each node on at least one other activated node of the plurality of activated nodes.

4. The method of claim 2, wherein the forward dynamics rule includes an activation probability of the each node.

5. The method of claim 4, wherein the each node has at least one provider node in the network, and wherein the activation probability is a function of a fraction of a number of activated provider nodes of the each node over a total number of provider nodes of the each node.

6. The method of claim 5 further comprising selecting the function prior to the assigning.

7. The method of claim 6, wherein the selecting includes selecting, for the assigning, one function from a plurality of different ones of the function.

8. The method of claim 6, wherein the selecting includes selecting, for the assigning, one function from at least two different ones of the function, wherein the one function is selected to facilitate providing a greatest resultant accuracy for the provided network structure of the network.

9. The method of claim 1 further comprising:
   determining, for the each node having two or more pairwise combinations, a greatest computed connection probability from among a plurality of computed connection probabilities, wherein the mapping includes mapping the true edge between the two activated nodes based on the determined greatest computed connection probability.

10. The method of claim 1, wherein:
    the identifying includes, for a first iteration, first identifying an occurrence of a first cascade;
    the determining includes, for the first iteration, first determining a first set of respective activation times for the each node, said method further comprising:
    for at least a second iteration, second identifying an occurrence of at least a second cascade; and
    for the at least a second iteration, second determining at least a second set of respective activation times for each node of the plurality of nodes activated during the at least a second cascade,
    wherein the computing includes, for each pairwise combination of activated nodes of the first and the at least a second cascades, computing the connection probability based on the first and the at least a second sets of respective activation times.

11. The method of claim 1 further comprising assigning a degree distribution to the network.

12. The method of claim 11 further comprising, wherein the assigned degree distribution is determined heuristically from a simulated network, the simulated network including at least one of a surrogate network and a random network.

13. The method of claim 1 further comprising iterating, for a plurality of iterations and for a plurality of cascades, through the identifying, the determining, and the computing.

14. The method of claim 13 further comprising iterating, for the plurality of iterations and the plurality of cascades, through the mapping.

15. The method of claim 13, wherein the mapping includes performing the mapping after completing the plurality of iterations.

16. The method of claim 13 wherein the iterating facilitates increasing, as compared to a provided network structure based on a first iteration of the plurality of iterations, an accuracy of the provided network structure during the mapping.

17. The method of claim 1, wherein the computing includes assigning respective connection weight values to the each pairwise combination, the respective connection weight values equal to respective computed connection probability values for the each pairwise combination.

18. The method of claim 1 or claim 2, wherein the computing includes calculating, for the each pairwise combination:
an activation probability that a first node of the pair of nodes and a second node of the pair of nodes activates at a first time and at a second time, respectively, given that the first and second nodes have the edge between them, wherein:
the second time occurs after the first time; and
the computing includes computing the connection probability based on the calculated activation probability.

19. The method of claim 18, wherein the surrogate network is a random network.

20. The method of claim 1 or claim 2, said method further executed on the computing device to provide an actual network structure for the network, said method further comprising:
generating a surrogate network;
simulating the occurrence of the cascade amongst a plurality of surrogate nodes of the surrogate network; and
determining, based on the simulating, an activation probability that a first node of the pair of nodes and a second node of the pair of nodes activates at a first time and at a second time, respectively, given that the first and second nodes have the edge between them, wherein:
the second time occurs after the first time; and
the computing includes computing the connection probability based on the determined activation probability.

21. The method of claim 1 or claim 2, wherein the computing includes calculating, for the each pairwise combination:
an activation probability that a first node of the pair of nodes and a second node of the pair of nodes activates at a first time and at a second time, respectively, given that the first and second nodes do not have an edge between them, wherein:
the second time occurs after the first time; and
the computing includes computing the connection probability based on the calculated activation probability.

22. The method of claim 1 or claim 2, said method further executed on the computing device to provide an actual network structure for the network, said method further comprising:
generating a surrogate network;
simulating the occurrence of the cascade on the amongst a plurality of surrogate nodes of the surrogate network; and
determining, based on the simulating, an activation probability that a first node of the pair of nodes and a second node of the pair of nodes activates at a first time and at a second time, respectively, given that the first and second nodes do not have the edge between them, wherein:
the second time occurs after the first time;
the computing includes computing the connection probability based on the determined activation probability.

23. The method of claim 22, wherein the surrogate network is a random network.

* * * * *